US011805478B2

(12) United States Patent
Li

(10) Patent No.: US 11,805,478 B2
(45) Date of Patent: Oct. 31, 2023

(54) NETWORK SLICE SELECTION METHOD, DEVICE, AND SYSTEM

(71) Applicant: HUAWEI TECHNOLOGIES CO., LTD., Guangdong (CN)

(72) Inventor: Zhuoming Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 202 days.

(21) Appl. No.: 17/345,476

(22) Filed: Jun. 11, 2021

(65) Prior Publication Data
US 2021/0306940 A1 Sep. 30, 2021

Related U.S. Application Data

(63) Continuation of application No. PCT/CN2019/121329, filed on Nov. 27, 2019.

(30) Foreign Application Priority Data

Dec. 13, 2018 (CN) .......................... 201811528668.8

(51) Int. Cl.
*H04W 48/18* (2009.01)
*H04W 8/02* (2009.01)
(Continued)

(52) U.S. Cl.
CPC ............. *H04W 48/18* (2013.01); *H04W 8/02* (2013.01); *H04W 8/18* (2013.01); *H04W 48/08* (2013.01); *H04W 48/16* (2013.01); *H04W 84/04* (2013.01)

(58) Field of Classification Search
CPC ..... H04W 48/08; H04W 48/16; H04W 48/18; H04W 8/02; H04W 8/18; H04W 84/04
See application file for complete search history.

(56) References Cited

U.S. PATENT DOCUMENTS

2017/0332421 A1   11/2017   Sternberg et al.
2018/0324577 A1   11/2018   Faccin et al.
(Continued)

FOREIGN PATENT DOCUMENTS

CN   106982458 A   7/2017
CN   108966691 A   12/2018
(Continued)

OTHER PUBLICATIONS

Office Action issued in Chinese Application No. 201811528668.8 dated Feb. 8, 2022, 5 pages.
(Continued)

*Primary Examiner* — Wayne H Cai
(74) *Attorney, Agent, or Firm* — Fish & Richardson P.C.

(57) ABSTRACT

One example method includes receiving, by a network slice selection function network element, a first message from a mobility management network element, where the first message includes network slice selection assistance information (NSSAI) subscribed to by a terminal and slice subscription information of n third-party service providers (SPs) corresponding to the NSSAI subscribed to by the terminal, and slice subscription information of a third-party SP comprises a first identifier. The network slice selection function network element can obtain, based on the first identifier, first mapping information corresponding to each third-party SP. The network slice selection function network element can determine allowed NSSAI for the terminal based on the NSSAI subscribed to by the terminal and the first mapping information, where the allowed NSSAI is used to indicate one or more network slices that the terminal is allowed to access in a visited network of the terminal.

13 Claims, 16 Drawing Sheets

(51) Int. Cl.
*H04W 8/18* (2009.01)
*H04W 48/08* (2009.01)
*H04W 48/16* (2009.01)
*H04W 84/04* (2009.01)

(56) References Cited

U.S. PATENT DOCUMENTS

| | | | |
|---|---|---|---|
| 2018/0367980 A1 | 12/2018 | Lee et al. | |
| 2018/0368061 A1 | 12/2018 | Yu et al. | |
| 2019/0141606 A1* | 5/2019 | Qiao | H04W 48/04 |
| 2020/0120589 A1* | 4/2020 | Velev | H04W 60/04 |
| 2020/0163008 A1* | 5/2020 | Hedman | H04W 36/125 |

FOREIGN PATENT DOCUMENTS

| | | |
|---|---|---|
| WO | 2018034924 A1 | 2/2018 |
| WO | 2018175498 A1 | 9/2018 |
| WO | 2018205147 A1 | 11/2018 |

OTHER PUBLICATIONS

ZTE et al., "23.502: Network Slicing Roaming Support (OI#2 and OI#3)," SA WG2 Meeting #123, S2-177038, Ljubljana, Slovenia, Oct. 23-27, 2017, 12 pages.

MediaTek Inc.,"Use of S-NSSAI at interworking from EPS to 5GS," 3GPP TSG SA WG2 Meeting #129bis, S2-1811853, West Palm Beach, USA, Nov. 26-30, 2018, 2 pages.

3GPP TS 23.501 V15.3.0 (Sep. 2018). 3rd Generation Partnership Project; Technical Specification Group Services and System Aspects; System Architecture for the 5G System; Stage 2 (Release 15), Sep. 2018, 226 pages.

3GPP TS 23.502 V15.3.0 (Sep. 2018), 3rd Generation Partnership Project; Technical Specification Group Services and System Aspects; Procedures for the 5G System; Stage 2 (Release 15), Sep. 2018, 330 pages.

3GPP TS 23.503 V15.3.0 (Sep. 2018), 3rd Generation Partnership Project; Technical Specification Group Services and System Aspects; Policy and Charging Control Framework for the 5G System; Stage 2 (Release 15), Sep. 2018, 70 pages.

3GPP TR 23.740 V1.0.0 (Dec. 2018), 3rd Generation Partnership Project; Technical Specification Group Services and System Aspects; Study on Enhancement of Network Slicing (Release 16), Dec. 2018, 71 pages.

PCT International Search Report and Written Opinion in International Application No. PCT/CN2019/121329, dated Mar. 3, 2020, 15 pages.

Office Action issued in Chinese Application No. 201811528668.8 dated Jul. 5, 2022, 6 pages (with English translation).

Extended European Search Report issued in European Application No. 19896960.2 dated Dec. 2, 2021, 10 pages.

NTT DOCOMO, "TS 23.502: OI#3: NSI binding in non-roaming scenario," SA WG2 Meeting #123, S2-177229, Ljubljana, Slovenia, Oct. 23-27, 2017, 10 pages.

* cited by examiner

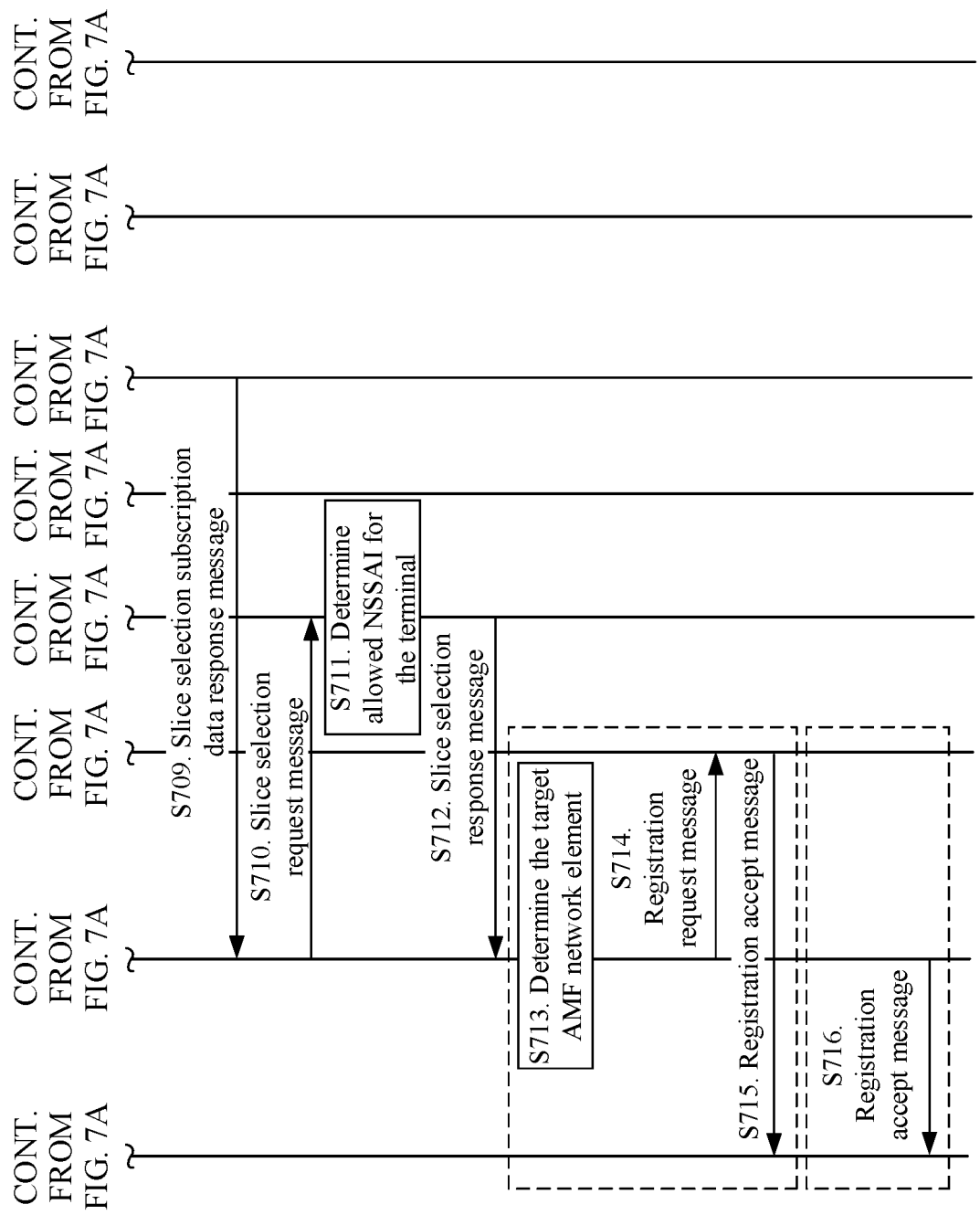

NETWORK SLICE SELECTION METHOD, DEVICE, AND SYSTEM

CROSS-REFERENCE TO RELATED APPLICATIONS

This application is a continuation of International Application No. PCT/CN2019/121329, filed on Nov. 27, 2019, which claims priority to Chinese Patent Application No. 201811528668.8, filed on Dec. 13, 2018. The disclosures of the aforementioned applications are hereby incorporated by reference in their entireties.

TECHNICAL FIELD

This application relates to the field of communications technologies and, in particular, to a network slice selection method, device, and system.

BACKGROUND

To support network slicing, an operator may create, on a physical infrastructure of a communications network based on an order of third-party industry tenant and a network slice template, a logically isolated network slice that has a specific network capability and network characteristic for the third-party industry tenant. Further, based on network slice selection assistance information (NSSAI), a network device of the operator may select a proper network slice for a terminal that uses a service of the third-party industry tenant. The NSSAI includes one or more pieces of single NSSAI (S-NSSAI), and the S-NSSAI may identify a network slice subscribed to by the third-party industry tenant.

Currently, values of the S-NSSAI may be classified into standard S-NSSAI and customized S-NSSAI. A quite large amount of customized S-NSSAI exists, and is suitable for network slices subscribed to by non-public service enterprises or third-party industries. If a third-party industry tenant subscribes to network slices from operators in a plurality of countries, generally all the operators allocate customized S-NSSAI to the third-party industry tenant. A value of one piece of customized S-NSSAI identifies only one network slice in a network of one operator. If a value of S-NSSAI subscribed to by a terminal in a home public land mobile network (HPLMN) is customized S-NSSAI (denoted as hS-NSSAI), when roaming, the terminal cannot use the hS-NSSAI in a visited public land mobile network (VPLMN) to determine a network slice that the terminal is allowed to use in the VPLMN, and can use only corresponding S-NSSAI (denoted as vS-NSSAI) valid in the VPLMN to determine the network slice that the terminal is allowed to use in the VPLMN.

To enable the terminal to obtain, in a roaming scenario, the S-NSSAI valid in the VPLMN and corresponding to S-NSSAI subscribed to by the terminal, a current solution is to configure network slice mapping information on a network device of the VPLMN based on a roaming agreement signed by the HPLMN and the VPLMN. Further, in a process in which the terminal registers with the VPLMN, the network device of the VPLMN may obtain the corresponding valid S-NSSAI in the VPLMN by using the network slice mapping information configured above with reference to the S-NSSAI subscribed to by the terminal, so as to determine the network slice that the terminal is allowed to use in the VPLMN. The roaming agreement signed between the VPLMN and the HPLMN includes the S-NSSAI valid in the VPLMN and corresponding to the S-NSSAI subscribed to by the terminal. If the terminal can use a network slice identified by customized S-NSSAI in the HPLMN and the VPLMN can provide a same or similar network slice that meets a requirement of a related communications service, when the roaming agreement is signed by the HPLMN and the VPLMN, the S-NSSAI of the two network slices is mapped together, that is, the hS-NSSAI is mapped to the vS-NSSAI.

However, the foregoing solution has the following problems: First, after subscribing to a network slice from the VPLMN of the terminal, the third-party industry tenant needs to notify the HPLMN of the terminal of customized S-NSSAI allocated by the VPLMN, and the HPLMN and the VPLMN update the roaming agreement. In addition, mapping information of the network slice is set on the network device of the VPLMN, and workload is relatively large. Second, a plurality of service providers (SP) may subscribe to network slices from an operator. Therefore, customized S-NSSAI allocated by the operator to the SPs may frequently change, and for each change, a roaming agreement signed with another operator needs to be updated. This obviously increases complexity and workload in roaming management.

Therefore, how to reduce complexity in managing slice mapping information by an operator when obtaining S-NSSAI valid in a VPLMN and corresponding to S-NSSAI subscribed to by a terminal is an urgent problem to be solved at present.

SUMMARY

Embodiments of this application provide a network slice selection method, device, and system, to reduce complexity in managing slice mapping information by an operator when S-NSSAI valid in a VPLMN and corresponding to S-NSSAI subscribed to by a terminal is obtained.

To achieve the foregoing objectives, the following technical solutions are used in the embodiments of this application.

According to a first aspect, a network slice selection method is provided. The method includes: A network slice selection function network element receives a first message from a mobility management network element, where the first message includes network slice selection assistance information NSSAI subscribed to by a terminal and slice subscription information of n third-party service providers SPs corresponding to the NSSAI subscribed to by the terminal, slice subscription information of each third-party SP in the slice subscription information of the n third-party SPs includes a first identifier, the first identifier is used to search for mapping information that is managed by each third-party SP and that is of NSSAI allocated by different operators to the third-party SP, and n is a positive integer; the network slice selection function network element obtains, based on the first identifier, first mapping information corresponding to each third-party SP, where the first mapping information includes mapping information between NSSAI of a home network of the terminal and NSSAI of a visited network of the terminal; and the network slice selection function network element determines allowed NSSAI for the terminal based on the NSSAI subscribed to by the terminal and the first mapping information, where the allowed NSSAI is used to indicate one or more network slices that the terminal is allowed to access in the visited network of the terminal. Based on the network slice selection method provided in this embodiment of this application, when determining the one or more network slices that the terminal is allowed to access in the visited network of the terminal, the network slice selection function network element may obtain the first mapping information corresponding to each third-party SP and may further determine the allowed NSSAI for the terminal based on the NSSAI subscribed to by the terminal and the first mapping information, where the allowed NSSAI is used to indicate the one or more network slices that the terminal is allowed to access in the visited network of the terminal. That is, the network slice selection function network element may obtain, based on mapping information that is managed by each third-party SP and that is of NSSAI allocated by different operators to the third-party SP, S-NSSAI valid in the visited network of the terminal and corresponding to the S-NSSAI subscribed to by the terminal. Therefore, complex slice mapping management in an existing operator roaming agreement is simplified, and this enables the third-party SP to flexibly provide unified application service experience in areas covered by a plurality of operators when the third-party SP subscribes to slices from the plurality of operators.

In a possible design, the first identifier includes at least one of a third-party identifier of each third-party SP or a device identifier of a third-party device of each third-party SP.

In a possible design, the first message further includes a network identifier of the home network of the terminal; and that the network slice selection function network element obtains, based on the first identifier, first mapping information corresponding to each third-party SP includes: The network slice selection function network element sends a second message to a unified data repository network element of the visited network of the terminal, where the second message includes the first identifier and the network identifier of the home network of the terminal; and the network slice selection function network element receives the first mapping information from the unified data repository network element of the visited network of the terminal. Based on this solution, the network slice selection function network element may obtain the first mapping information corresponding to each third-party SP.

In a possible design, the first message further includes a network identifier of the home network of the terminal; and that the network slice selection function network element obtains, based on the first identifier, first mapping information corresponding to each third-party SP includes: The network slice selection function network element queries, based on the first identifier and with reference to the network identifier of the home network of the terminal, locally stored mapping information between NSSAI allocated by different operators to each third-party SP, to obtain the first mapping information. Based on this solution, the network slice selection function network element may obtain the first mapping information corresponding to each third-party SP.

In a possible design, the method further includes: The network slice selection function network element separately receives mapping information between NSSAI allocated by different operators to each third-party SP from a third-party device of the third-party SP.

In a possible design, the first identifier includes at least one of a third-party identifier allocated by each third-party SP, a device identifier of a third-party device corresponding to each third-party SP, or an identifier of the terminal.

In a possible design, the first message further includes a network identifier of the home network of the terminal; and that the network slice selection function network element obtains, based on the first identifier, first mapping information corresponding to each third-party SP includes: The network slice selection function network element separately sends a third message to a third-party device of each third-party SP, where the third message includes the first identifier, the network identifier of the home network of the terminal, and a network identifier of the visited network of the terminal; and the network slice selection function network element separately receives the first mapping information from the third-party device of each third-party SP. Based on this solution, the network slice selection function network element may obtain the first mapping information corresponding to each third-party SP.

In a possible design, the second message or the third message further includes one or more of the NSSAI subscribed to by the terminal; and the NSSAI of the home network of the terminal is one or more of the NSSAI subscribed to by the terminal.

According to a second aspect, a network slice selection method is provided. The method includes: A first network device receives a first message, where the first message includes an identifier of a terminal; the first network device obtains slice selection subscription data based on the identifier of the terminal, where the slice selection subscription data includes network slice selection assistance information NSSAI subscribed to by the terminal and slice subscription information of n third-party service providers SPs corresponding to the NSSAI subscribed to by the terminal, slice subscription information of each third-party SP in the slice subscription information of the n third-party SPs includes a first identifier, the first identifier is used to search for mapping information that is managed by each third-party SP and that is of NSSAI allocated by different operators to the third-party SP, and n is a positive integer; and the first network device sends a second message, where the second message includes the identifier of the terminal and the slice selection subscription data. Based on the network slice selection method provided in this embodiment of this application, the network slice selection function network element may obtain the slice selection subscription data of the terminal and may further obtain the first mapping information based on the slice subscription information in the slice selection subscription data of the terminal and determine allowed NSSAI for the terminal based on the NSSAI subscribed to by the terminal and the first mapping information, where the allowed NSSAI is used to indicate one or more network slices that the terminal is allowed to access in a visited network of the terminal. That is, the network slice selection function network element may obtain, based on mapping information that is managed by each third-party SP and that is of NSSAI allocated by different operators to the third-party SP, S-NSSAI valid in the visited network of the terminal and corresponding to the S-NSSAI subscribed to by the terminal. Therefore, complex slice mapping management in an existing operator roaming agreement is simplified, and this enables the third-party SP to flexibly provide unified application service experience in areas covered by a plurality of operators when the third-party SP subscribes to slices from the plurality of operators.

In a possible design, the first network device is a unified data management network element or a unified data repository network element of a home network of the terminal.

In a possible design, that the first network device obtains slice selection subscription data based on the identifier of the terminal includes: The first network device determines, based on the identifier of the terminal, the NSSAI subscribed to by the terminal; and the first network device determines the first identifier based on the NSSAI subscribed to by the terminal and n first correspondences, where each first correspondence in the n first correspondences includes a correspondence between the first identifier and NSSAI subscribed to by each third-party SP, and the NSSAI subscribed to by each third-party SP includes one or more of the NSSAI subscribed to by the terminal. Based on this solution, the first network device may obtain the slice selection subscription data of the terminal.

In a possible design, the method further includes: The first network device separately receives each first correspondence from a third-party device of each third-party SP, to obtain the n first correspondences.

In a possible design, after the first network device determines the first identifier, the method further includes: The first network device separately sends a fourth message to the third-party device of each third-party SP, where the fourth message includes the first identifier, a network identifier of the home network of the terminal, and a network identifier of a visited network of the terminal; and the first network device separately receives first mapping information corresponding to each third-party SP from a third-party device of the third-party SP, where the first mapping information includes mapping information between NSSAI of the home network of the terminal and NSSAI of the visited network of the terminal. Based on this solution, the first network device may obtain the first mapping information corresponding to each third-party SP.

In a possible design, the fourth message further includes one or more of the NSSAI subscribed to by the terminal; and the NSSAI of the home network of the terminal is one or more of the NSSAI subscribed to by the terminal.

In a possible design, the first network device is the unified data management network element; and that the first network device obtains slice selection subscription data based on the identifier of the terminal includes: The first network device sends a third message to the unified data repository network element of the home network of the terminal, where the third message includes the identifier of the terminal and is used to request the slice selection subscription data; and the first network device receives the slice selection subscription data from the unified data repository network element. Based on this solution, the first network device may obtain the slice selection subscription data of the terminal.

According to a third aspect, a network slice selection method is provided. The method includes: A unified data repository network element of a visited network of a terminal receives a first message from a network slice selection function network element, where the first message includes a network identifier of a home network of the terminal and a first identifier in slice subscription information of each third-party service provider SP in n third-party SPs corresponding to NSSAI subscribed to by the terminal, and the first identifier is used to search for mapping information that is managed by each third-party SP and that is of NSSAI allocated by different operators to the third-party SP; the unified data repository network element determines, based on the first identifier and the network identifier of the home network of the terminal, first mapping information corresponding to each third-party SP, where the first mapping information includes mapping information between NSSAI of the home network of the terminal and NSSAI of the visited network of the terminal; and the unified data repository network element sends the first mapping information to the network slice selection function network element. For a technical effect of the third aspect, refer to the first aspect. Details are not described herein again.

In a possible design, that the unified data repository network element determines, based on the first identifier and the network identifier of the home network of the terminal, first mapping information corresponding to each third-party SP includes: The unified data repository network element determines the first mapping information based on the first identifier and the network identifier of the home network of the terminal, and queries locally stored mapping information between NSSAI allocated by different operators to each third-party SP, to obtain the first mapping information. Based on this solution, the unified data repository network element may determine the first mapping information corresponding to each third-party SP.

In a possible design, the method further includes: The unified data repository network element separately receives mapping information between NSSAI allocated by different operators to each third-party SP from a third-party device of the third-party SP.

In a possible design, the first message further includes one or more of the NSSAI subscribed to by the terminal; and the NSSAI of the home network of the terminal is one or more of the NSSAI subscribed to by the terminal.

According to a fourth aspect, a network slice selection method is provided. The method includes: A third-party device of a third-party service provider SP receives a first message from a second network device, where the first message includes a first identifier, a network identifier of a home network of a terminal, and a network identifier of a visited network of the terminal, and the first identifier is used to search for mapping information that is managed by the third-party SP and that is of network slice selection assistance information NSSAI allocated by different operators to the third-party SP; the third-party device determines, based on the first identifier, the network identifier of the home network of the terminal, and the network identifier of the visited network of the terminal, first mapping information corresponding to the third-party SP, where the first mapping information includes mapping information between NSSAI of the home network of the terminal and NSSAI of the visited network of the terminal; and the third-party device sends the first mapping information to the second network device. For a technical effect of the fourth aspect, refer to the first aspect. Details are not described herein again.

In a possible design, that the third-party device determines, based on the first identifier, the network identifier of the home network of the terminal, and the network identifier of the visited network of the terminal, first mapping information corresponding to each third-party SP includes: The third-party device queries, based on the first identifier, the network identifier of the home network of the terminal, and the network identifier of the visited network of the terminal, locally stored mapping information between NSSAI allocated by different operators to each third-party SP, to obtain the first mapping information.

In a possible design, the second network device includes a network slice selection function network element, a unified data management network element, or an authentication, authorization, and accounting proxy function network element.

According to a fifth aspect, a communications apparatus is provided to implement the foregoing methods. The communications apparatus may be the network slice selection function network element in the first aspect, or an apparatus including the network slice selection function network element; or the communications apparatus may be the first network device in the second aspect, or an apparatus including the first network device; or the communications apparatus may be the unified data repository network element in the third aspect, or an apparatus including the unified data repository network element; or the communications apparatus may be the third-party device in the fourth aspect, or an apparatus including the third-party device. The communications apparatus includes corresponding modules, units, or means for implementing the foregoing methods. The modules, units, or means may be implemented by hardware, software, or hardware by executing corresponding software. The hardware or the software includes one or more modules or units corresponding to the functions.

According to a sixth aspect, a communications apparatus is provided, including a processor and a memory, where the memory is configured to store a computer instruction, and when the processor executes the instruction, the communications apparatus performs the method in any one of the foregoing aspects. The communications apparatus may be the network slice selection function network element in the first aspect, or an apparatus including the network slice selection function network element; or the communications apparatus may be the first network device in the second aspect, or an apparatus including the first network device; or the communications apparatus may be the unified data repository network element in the third aspect, or an apparatus including the unified data repository network element; or the communications apparatus may be the third-party device in the fourth aspect, or an apparatus including the third-party device.

According to a seventh aspect, a communications apparatus is provided, including a processor, where the processor is configured to: after being coupled to a memory and reading an instruction in the memory, perform, according to the instruction, the method in any one of the foregoing aspects. The communications apparatus may be the network slice selection function network element in the first aspect, or an apparatus including the network slice selection function network element; or the communications apparatus may be the first network device in the second aspect, or an apparatus including the first network device; or the communications apparatus may be the unified data repository network element in the third aspect, or an apparatus including the unified data repository network element; or the communications apparatus may be the third-party device in the fourth aspect, or an apparatus including the third-party device.

According to an eighth aspect, a computer readable storage medium is provided. The computer readable storage medium stores an instruction, and when the instruction runs on a computer, the computer is enabled to perform the method in any one of the foregoing aspects.

According to a ninth aspect, a computer program product including an instruction is provided. When the computer program product runs on a computer, the computer is enabled to perform the method in any one of the foregoing aspects.

According to a tenth aspect, a communications apparatus (for example, the communications apparatus may be a chip or a chip system) is provided. The communications apparatus includes a processor, configured to implement a function in any one of the foregoing aspects. In a possible design, the communications apparatus further includes a memory, and the memory is configured to store a necessary program instruction and data. When the communications apparatus is a chip system, the communications apparatus may include a chip, or may include a chip and another discrete device.

For technical effects brought by any one of design manners in the fifth aspect to the tenth aspect, refer to technical effects brought by different design manners of the first aspect, the second aspect, the third aspect, or the fourth aspect. Details are not described herein again.

According to an eleventh aspect, a network slice selection system is provided. The network slice selection system includes one or more of a network slice selection function network element, a first network device, a unified data repository network element, or a third-party device, and the network slice selection function network element is configured to perform steps performed by the network slice selection function network element in the first aspect or the solutions provided in the embodiments of this application; the first network device is configured to perform steps performed by the first network device in the second aspect or the solutions provided in the embodiments of this application; the unified data repository network element is configured to perform steps performed by the unified data repository network element in the third aspect or the solutions provided in the embodiments of this application; and the third-party device is configured to perform steps performed by the third-party device in the fourth aspect or the solutions provided in the embodiments of this application.

In a possible design, the network slice selection system may further include another device that interacts with one or more of the network slice selection function network element, the first network device, the unified data repository network element, or the third-party device, such as a mobility management network element or a network exposure function network element. This is not specifically limited in this embodiment of this application.

These aspects or other aspects of this application are clearer and more comprehensible in descriptions of the following embodiments.

BRIEF DESCRIPTION OF DRAWINGS

FIG. 7A and FIG. 7B are a schematic interaction flowchart 4 of a network slice selection method according to an embodiment of this application;

DESCRIPTION OF EMBODIMENTS

Figure 1:
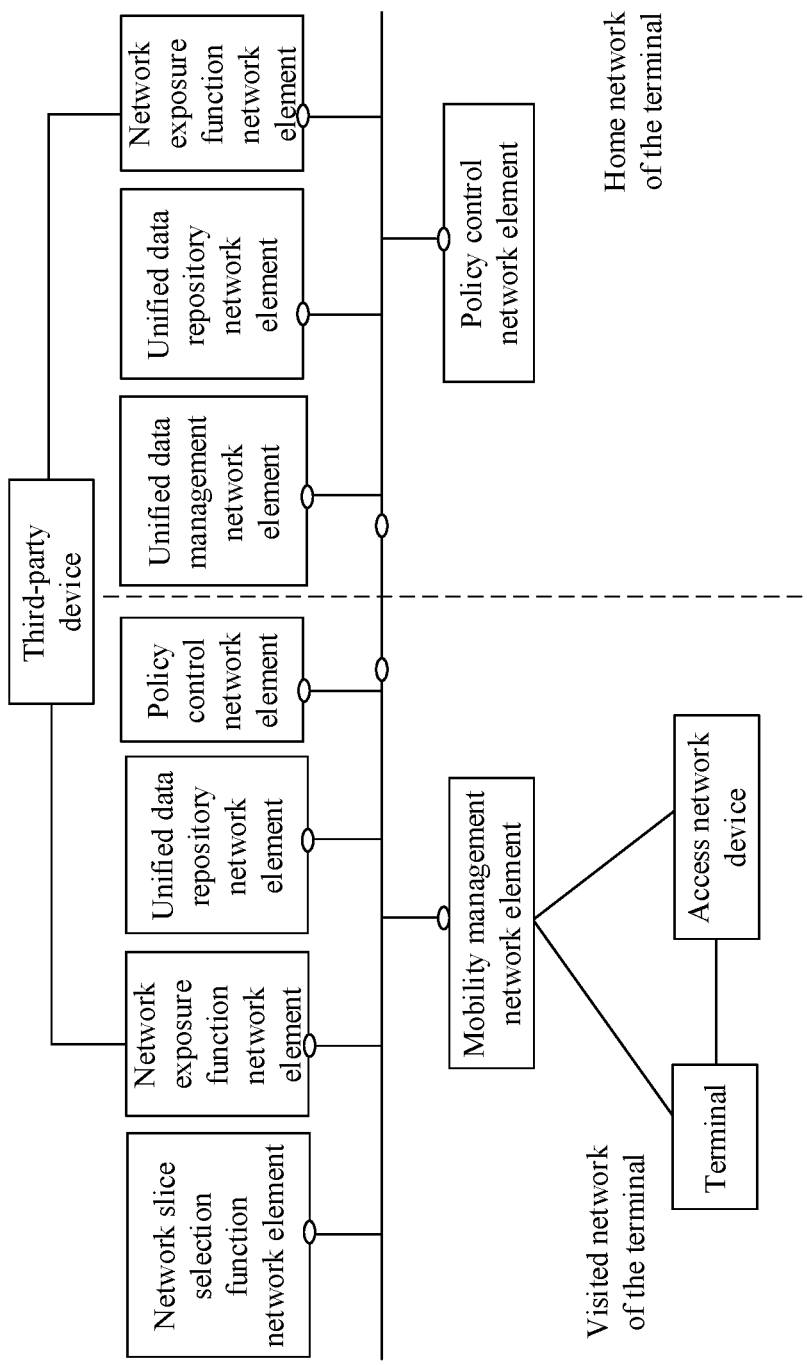
FIG. 1 is a schematic diagram of a possible network architecture to which an embodiment of this application is applicable.

For ease of understanding of the technical solutions in the embodiments of this application, the technologies related to this application are first briefly described as follows.

Network Slice:

A network slice is a logically isolated network used to support a specific network capability and network characteristic, may include an end to end (E2E) entire network, or may share some network functions in a plurality of network slices, and is a key technology that meets network differentiation requirement of a 5th generation (5G) mobile communications technology proposed by the 3rd Generation Partnership Project (3GPP). Generally, network features of different network slices are different, and network slices need to be isolated from each other so that they do not affect each other. For example, a network slice of an augmented reality (AR) or virtual reality (VR) service requires a large bandwidth and a low latency. A network slice of internet of things (JOT) service needs to support a large quantity of terminal access, but has a small bandwidth, and does not impose a latency requirement.

NSSAI and S-NSSAI:

The NSSAI includes one or more pieces of S-NSSAI, and the S-NSSAI may identify a network slice subscribed to by a third-party industry tenant. Each piece of S-NSSAI includes a slice/service type (SST) and a slice differentiator (SD). The SST includes a standardized SST and an operator-defined SST. Currently, the defined standardized SST includes enhanced mobile broadband (eMBB), ultra-reliable and low-latency communication (URLLC), and massive internet of things (MIoT). The SD is optional information for supplementing the SST to distinguish between a plurality of network slices of a same SST. Generally, the SD includes a tenant identifier of a subscribed slice, other customization information, and the like. A specific use method of the SD is not limited in a standard.

Requested NSSAI:

The requested NSSAI is used to identify one or more network slices that a terminal requests to access at a network registration stage, and includes one or more pieces of S-NSSAI.

Subscribed NSSAI:

The subscribed NSSAI is used to identify one or more network slices that a terminal subscribes to in a home network, includes one or more pieces of S-NSSAI, and is generally stored in a subscription database of the terminal.

Allowed NSSAI:

The allowed NSSAI is used to identify one or more network slices that a terminal is allowed to use in a current registration area network provided by a service network, and includes one or more pieces of S-NSSAI.

The following describes the technical solutions in the embodiments of this application with reference to the accompanying drawings in the embodiments of this application. In descriptions of this application, unless otherwise specified, "/" represents the "or" relationship between associated objects, for example, A/B may represent A or B; and "and/or" in this application describes only an association relationship for describing associated objects and represents that three relationships may exist. For example, A and/or B may represent the following three cases: Only A exists, both A and B exist, and only B exists. A and B may be singular or plural. In addition, in the descriptions of this application, "a plurality of" means two or more than two. "At least one of the following items" or a similar expression means any combination of these items, including any combination of a single item or a plurality of items. For example, at least one of a, b, or c may represent a, b, c, a-b, a-c, b-c, or a-b-c, where a, b, and c may be in a singular or plural form. In addition, to clearly describe technical solutions in embodiments of this application, terms such as "first" and "second" are used in the embodiments of this application to distinguish between same items or similar items that have basically the same functions or purposes. A person skilled in the art may understand that the terms such as "first" and "second" do not limit a quantity or an execution sequence, and the terms such as "first" and "second" do not mean being definitely different.

In addition, a network slice selection method provided in the embodiments of this application is applicable to a plurality of network architectures. The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

FIG. 1 is a schematic diagram of a possible network architecture to which an embodiment of this application is applicable. The network architecture may include one or more of a terminal, an access network device, a mobility management network element, a network slice selection function network element, a unified data management network element, a unified data repository network element, a policy control network element, a network exposure function network element, or a third-party device. In a roaming scenario of the terminal, a home network of the terminal includes one or more of the unified data management network element, the unified data repository network element, the policy control network element, or the network exposure function network element; and a visited network of the terminal includes one or more of the terminal, the access network device, the mobility management network element, the network slice selection function network element, the unified data repository network element, the policy control network element, or the network exposure function network element.

The terminal is a device that has a wireless transmission/reception function, and the terminal may be deployed on land, for example, an indoor device, an outdoor device, a handheld device, or an in-vehicle device, or may be deployed on the water (for example, on a ship), or may be deployed in the air (for example, on a plane, a balloon, or a satellite). The terminal may be user equipment (UE), an access terminal, a terminal unit, a terminal station, a mobile station, a mobile console, a remote station, a remote terminal, a mobile device, a wireless communications device, a terminal agent, a terminal apparatus, or the like in a 5G system or a future evolved PLMN. The access terminal may be a cellular phone, a cordless telephone set, a session initiation protocol (SIP) phone, a wireless local loop (WLL) station, a personal digital assistant (PDA), a handheld device with a wireless communications function, a computing device or another processing device connected to a wireless modem, an in-vehicle device or a wearable device, a virtual reality (VR) terminal device, an augmented reality (AR) terminal device, a wireless terminal in industrial control, a wireless terminal in self driving, a wireless terminal in remote medical, a wireless terminal in smart grid, a wireless terminal in transportation safety, a wireless terminal in smart city, a wireless terminal in smart home, or the like. The terminal may be mobile or fixed.

An access network (radio access network, RAN) device is a device that provides a wireless communications function for the terminal. For example, the access network device includes but is not limited to a next-generation base station (gnodeB, gNB) in 5G, an evolved NodeB (eNB), a radio network controller (RNC), a node B (NB), a base station controller (BSC), a base transceiver station (BTS), a home base station (for example, home evolved nodeB, or home node B, HNB), a baseband unit (BBU), a transmitting and receiving point (TRP), a transmitting point (TP), a mobile switching center, and the like.

The mobility management network element is mainly used for mobility management in a mobile network, such as user location update, user network registration, and user handover. In a 5G communications system, the mobility management network element may be an access and mobility management function (AMF) network element, and Namf is a service-based interface provided by the AMF network element. The AMF network element may communicate with another network function by using the Namf. In future communications such as 6th generation (6G) communications, the mobility management network element may still be the AMF network element or have another name. This is not limited in this embodiment of this application.

The network exposure function network element mainly provides a service so that a 3rd Generation Partnership Project (3GPP) network can securely provide a network service capability to a third-party device of a third-party SP. In the 5G communications system, the network exposure function network element may be a (network exposure function, NEF) network element, and Nnef is a service-based interface provided by the NEF network element. The NEF network element may communicate with another network function by using the Nnef. In future communications such as the 6G communications system, the network exposure function network element may still be the NEF network element or have another name. This is not limited in this embodiment of this application.

The policy control network element is configured to guide a unified policy framework of network behavior, and provide policy rule information and like for a control plane function network element (such as the AMF network element). In the 5G communications system, the policy control network element may be a policy control function (PCF) network element, and Npcf is a service-based interface provided by the PCF. The PCF may communicate with another network function by using the Npcf. In future communications such as the 6G communications, the policy control function network element may still be the PCF network element or have another name. This is not limited in this embodiment of this application.

The unified data management network element is configured to process a user identifier, access authentication, registration, mobility management, or the like. In the 5G communications system, the unified data management network element may be a unified data management (UDM) network element, and Nudm is a service-based interface provided by the UDM network element. The UDM network element may communicate with another network function by using the Nudm. In future communications such as the 6G communications, the unified data management network element may still be the UDM network element or have another name. This is not limited in this embodiment of this application.

The unified data repository network element is configured to store and query structured data. The structured data is data of a structure and semantics defined in a standard. Each party may understand, according to the standard, a meaning represented by the data. The unified data repository network element may store and query subscription data by using the unified data management network element, may store or query policy data by using the policy control network element, or may store and query application-related data by using an application function directly or the network exposure function network element. In the 5G communications system, the unified data repository network element may be a unified data repository (UDR) network element, and Nudr is a service-based interface provided by the UDR network element. The UDR network element may communicate with another network function by using the Nudr. In future communications such as the 6G communications, the unified data repository network element may still be the UDR network element or have another name. This is not limited in this embodiment of this application.

The network slice selection function network element is configured to select a network slice and the like for the terminal. In the 5G communications system, the network slice selection function network element may be a network slice selection function (NSSF) network element, and Nnssf is a service-based interface provided by the NSSF network element. The NSSF network element may communicate with another network function by using the Nnssf. In future communication such as the 6G communication, the network slice selection function network element may still be the NSSF network element or have another name. This is not limited in this embodiment of this application.

The third-party device is configured to: set slice subscription information of a corresponding third-party SP to the unified data repository network element or the unified data management network element, or set mapping information between NSSAI allocated by different operators to a third-party SP to the unified data repository network element or the unified data management network element. For related implementation, refer to a subsequent method embodiment, and details are not described herein. Optionally, in this embodiment of this application, there may be one or more third-party devices. This is not specifically limited in this embodiment of this application.

Figure 2:
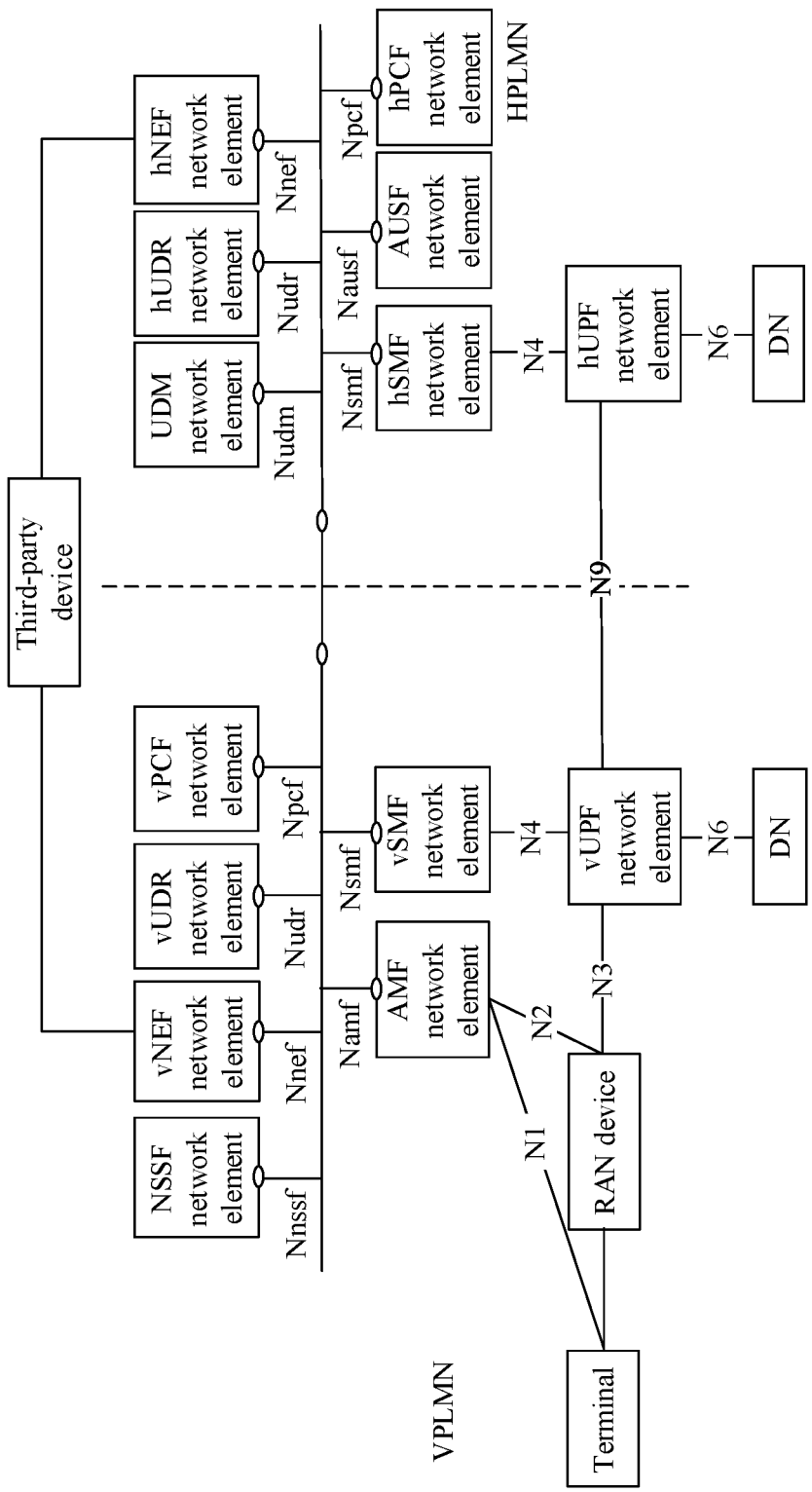
FIG. 2 is a schematic diagram of a possible 5G network architecture to which an embodiment of this application is applicable.

FIG. 2 is a schematic diagram of a specific possible network architecture to which an embodiment of this application is applicable, with a 5G communications system being used as an example. A VPLMN includes one or more of the foregoing terminal, RAN device, AMF network element, NSSF network element, visited NEF (vNEF) network element, visited UDR (vUDR) network element, or visited PCF (vPCF) network element. An HPLMN includes one or more of the foregoing UDM network element, home NEF (hNEF) network element, home UDR (hUDR) network element, or home PCF (vPCF) network element. In addition, as shown in FIG. 2, the VPLMN may further include a visited session management function (vSMF) network element, a visited user plane function (vUPF) network element, a data network (DN), and the like. The HPLMN may further include a home session management function (hSMF) network element, an authentication server function (AUSF) network element, a home user plane function (hUPF) network element, a data network (DN), and the like. This is not specifically limited in this embodiment of this application.

An N1 interface in FIG. 2 is a reference point between the terminal and the AMF network element. An N2 interface is a reference point between the RAN device and the AMF network element, and is used to send a non-access stratum (NAS) message and a next generation application protocol (NGAP) message and the like. An N3 interface is a reference point between the RAN device and the vUPF network element and is used to transmit user plane data and the like. An N4 interface is a reference point between the SMF network element and the UPF network element (for example, between the vSMF network element and the vUPF network element, or between the hSMF network element and the hUPF network element) and is used to transmit information such as identifier information of a tunnel connected to the N3, data cache indication information, and a downlink data notification message. An N6 interface is a reference point between the UPF network element (such as the vUPF network element or the hUPF network element) and the DN, and is used to transmit user plane data and the like.

In addition, control plane network elements such as the AUSF network element, the AMF network element, the SMF network element (such as the vSMF network element or the hSMF network element), the NSSF network element, the NEF network element (such as the vNEF network element or the hNEF network element), the PCF network element (such as the vPCF network element or the hPCF network element), the UDM network element, or the UDR network element (such as the vUDR network element or the hUDR network element) shown in FIG. 2 may also perform interaction by using a service-based interface. For example, an external service-based interface provided by the AUSF network element may be Nausf. An external service-based interface provided by the AMF network element may be Namf. An external service-based interface provided by the SMF network element may be Nsmf. An external service-based interface provided by the PCF network element may be Npcf. An external service-based interface provided by the UDM network element may be Nudm. An external service-based interface provided by the NEF network element may be Nnef. An external service-based interface provided by the NSSF network element may be Nnssf. An external service-based interface provided by the UDR network element may be Nudr. For related descriptions, refer to the 5G system architecture diagram in the 23501 standard. Details are not described herein.

It may be understood that the network element or the function may be a network component in a hardware device, or may be a software function running on dedicated hardware or a virtualization function instantiated on a platform (such as a cloud platform). The network element or the function may be divided into one or more services, and further, a service that exists independently of a network function may occur. In this application, an instance of the function, an instance of a service included in the function, or an instance of a service that exists independently of a network function may be referred to as a service instance.

Figure 3:
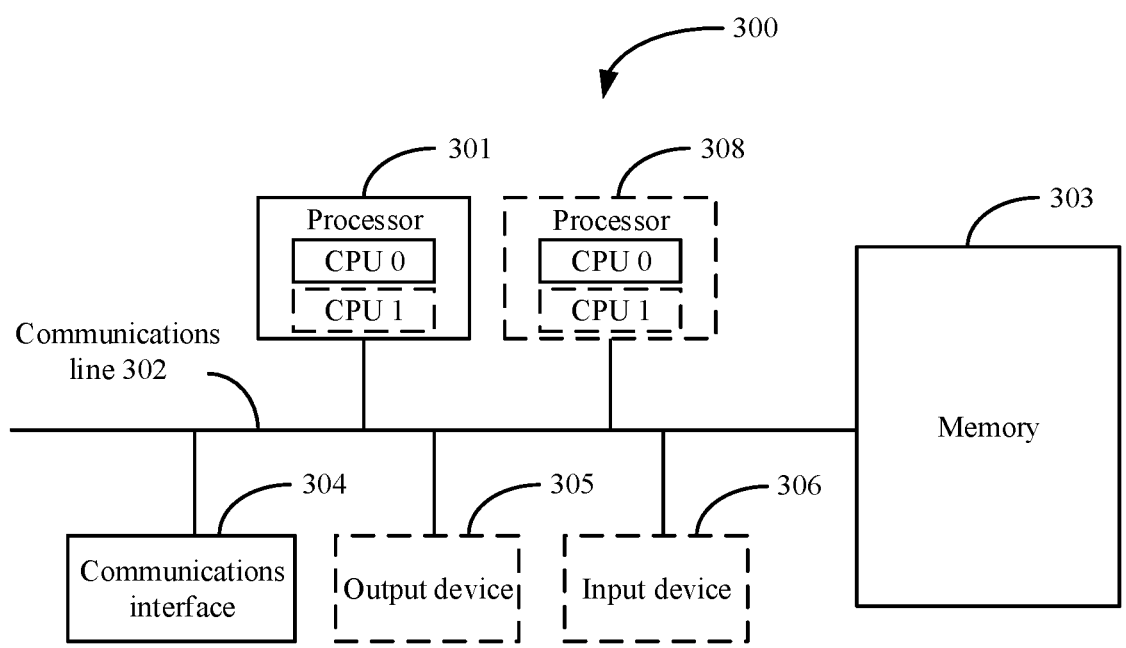
FIG. 3 is a schematic structural diagram of a communications device according to an embodiment of this application.

For example, the network element or the function may be implemented by using a communications device (which may also be referred to as a communications apparatus) in FIG. 3. FIG. 3 is a schematic structural diagram of hardware of a communications device according to an embodiment of this application. The communications device 300 includes a processor 301, a communications line 302, a memory 303, and at least one communications interface (in FIG. 3, only an example including a communications interface 304 is used for description).

The processor 301 may be a general-purpose central processing unit (CPU), a microprocessor, an application-specific integrated circuit (ASIC), or one or more integrated circuits configured to control program execution of the solution in this application.

The communications line 302 may include a path transmitting information between the foregoing components.

The communications interface 304 is any apparatus such as a transceiver, and is configured to communicate with another device or communications network such as Ethernet, a radio access network (RAN), or a wireless local area network (WLAN).

The memory 303 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM), or other compact disc storage or optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor by using the communications line 302. Alternatively, the memory may be integrated into the processor.

The memory 303 is configured to store a computer executable instruction used to execute the solution of this application, and the computer executable instruction is executed under control of the processor 301. The processor 301 is configured to execute the computer executable instruction stored in the memory 303, to implement a network slice selection method provided in the following embodiment of this application.

Optionally, the computer executable instruction in this embodiment of this application may also be referred to as application program code. This is not specifically limited in this embodiment of this application.

During specific implementation, in an embodiment, the processor 301 may include one or more CPUs, for example, a CPU 0 and a CPU 1 in FIG. 3.

In specific implementation, in an embodiment, the communications device 300 may include a plurality of processors such as the processor 301 and a processor 308 in FIG. 3. Each of these processors may be a single-core (single-CPU) processor, or may be a multi-core (multi-CPU) processor. The processor herein may be one or more devices, circuits, and/or processing cores for processing data (such as a computer program instruction).

In specific implementation, in an embodiment, the communications device 300 may further include an output device 305 and an input device 306. The output device 305 communicates with the processor 301 and may display information in a plurality of manners. For example, the output device 305 may be a liquid crystal display (LCD), a light emitting diode (LED) display device, a cathode ray tube (CRT) display device, or a projector. The input device 306 communicates with the processor 301, and may receive input of a user in a plurality of manners. For example, the input device 306 may be a mouse, a keyboard, a touchscreen device, or a sensing device.

The communications device 300 may be a general-purpose device or a dedicated device. In specific implementation, the communications device 300 may be a desktop computer, a portable computer, a network server, a personal digital assistant (PDA), a mobile phone, a tablet computer, a wireless terminal device, an embedded device, or a device with a structure similar to that in FIG. 3. A type of the communications device 300 is not limited in this embodiment of this application.

The following describes in detail the network slice selection method provided in the embodiments of this application with reference to FIG. 1 to FIG. 3.

It should be noted that this embodiment of this application is not limited to the 5G network architecture shown in FIG. 2 and may alternatively be applied to another communications system in the future, such as a 6G network architecture. In addition, a name of each network element used in this embodiment of this application may remain a same function in a future communications system, but the name may change.

In this embodiment of this application, when a third-party SP subscribes to a network slice from an operator, the operator allocates S-NSSAI to the network slice subscribed to by the third-party SP. In addition, the third-party SP may further notify the operator whether the third-party SP has subscribed to or plans to subscribe to a corresponding network slice in another country. If the third-party SP has subscribed to or plans to subscribe to a corresponding network slice in another country, the third-party SP may choose the third-party SP itself to determine or manage, in a roaming scenario, a correspondence between S-NSSAI of network slices subscribed to from different operators (or may be described as mapping information between NSSAI allocated by different operators to the third-party SP).

Figure 4A:
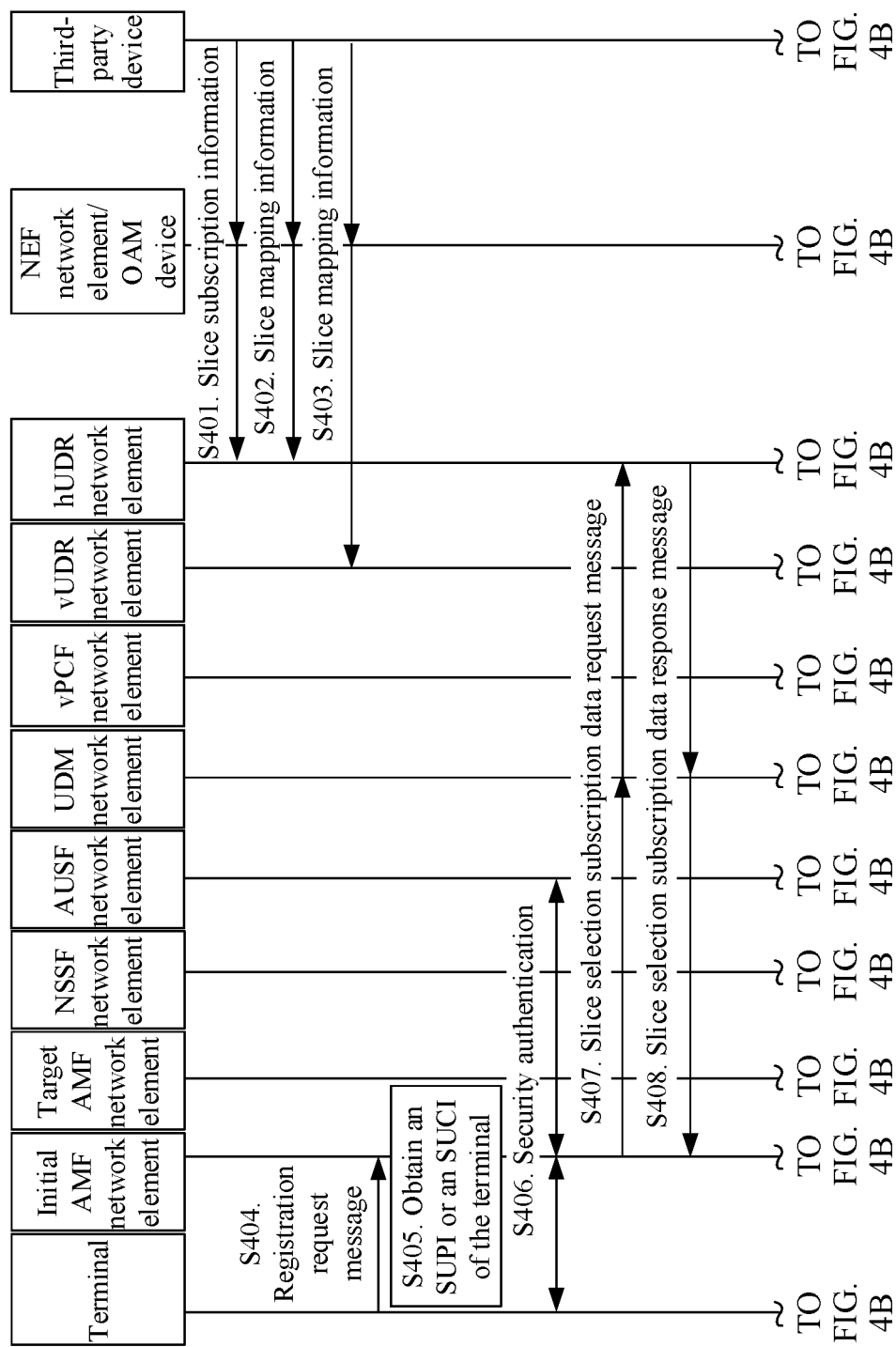
FIG. 4A and FIG. 4B are a schematic interaction flowchart 1 of a network slice selection method according to an embodiment of this application.
Figure 4B:
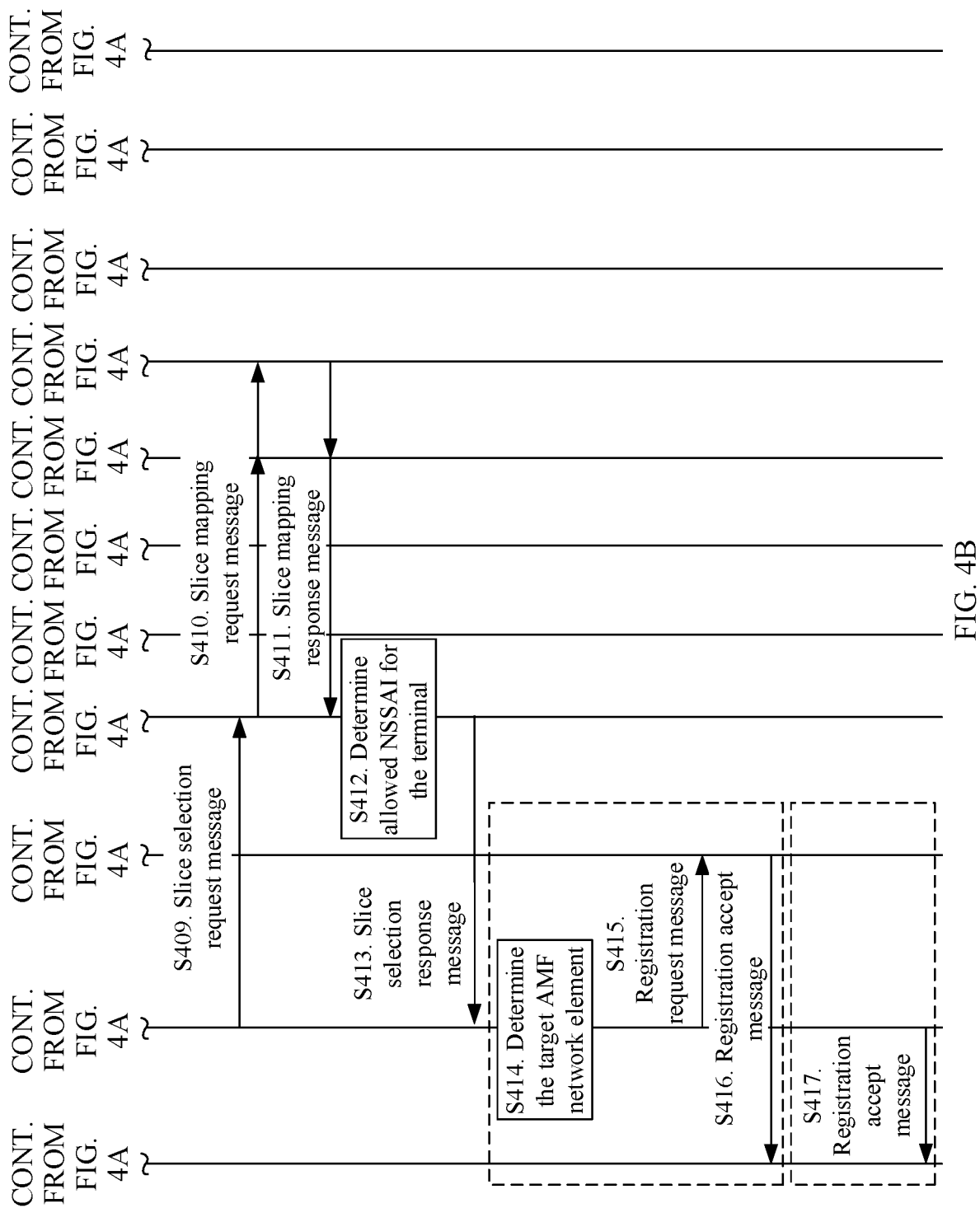

In a possible implementation, the mobility management network element sends a first message to the network slice selection function network element, where the first message includes NSSAI subscribed to by the terminal and slice subscription information of n third-party SPs corresponding to the NSSAI subscribed to by the terminal, slice subscription information of each third-party SP in the slice subscription information of the n third-party SPs includes a first identifier, the first identifier is used to search for mapping information that is managed by each third-party SP and that is of NSSAI allocated by different operators to the third-party SP, and n is a positive integer. Further, after receiving the first message from the mobility management network element, the network slice selection function network element obtains, based on the first identifier, first mapping information corresponding to each third-party SP, and determines allowed NSSAI for the terminal based on the NSSAI subscribed to by the terminal and the first mapping information, where the first mapping information includes mapping information between NSSAI of a home network of the terminal and NSSAI of a visited network of the terminal; and the allowed NSSAI for the terminal is used to indicate one or more network slices that the terminal is allowed to access in the visited network of the terminal. The following provides several possible implementations by way of example as follows:

Optionally, that the network architecture shown in FIG. 1 is applied to the 5G network shown in FIG. 2 is used as an example. FIG. 4A and FIG. 4B show a network slice selection method according to an embodiment of this application. The network slice selection method includes the following steps:

S401. A third-party device of a third-party SP sends slice subscription information of the third-party SP to an hUDR network element by using an NEF network element or an operation, administration, and maintenance (OAM) device. Correspondingly, the hUDR network element receives the slice subscription information of the third-party SP that is sent by the third-party device by using the NEF network element or the OAM device.

It should be noted that, in this embodiment of this application, a network element of a home network and a network element of a visited network are described with respect to a home network and a visited network of a terminal device in FIG. 4A and FIG. 4B. For example, the hUDR network element herein is a UDR network element in an HPLMN of the terminal device in FIG. 4A and FIG. 4B, and the following vUDR network element is a UDR network element in a VPLMN of the terminal device in FIG. 4A and FIG. 4B. In addition, the home network is also a network on which a network slice is currently subscribed to by an operator, and the visited network is also one of networks of all other operators that currently subscribe to network slices that can provide same or similar communications services. This description is applicable to this embodiment and the following embodiments. This is collectively described herein and is not described in the following again.

In this embodiment of this application, the slice subscription information of the third-party SP includes a first identifier, and the first identifier is used to search for mapping information that is managed by the third-party SP and that is of NSSAI allocated by different operators to the third-party SP. Generally, an application client (app client) on a terminal subscribes to a third-party service by using the first identifier.

For example, the first identifier may include at least one of a third-party identifier of the third-party SP, a device identifier of a third-party device of the third-party SP, or an identifier of the terminal.

For example, the third-party identifier herein may include an application identifier, a tenant identifier, or a user group identifier.

For example, the device identifier of the third-party device herein may include a domain name of the third-party device.

For example, the identifier of the terminal herein may include a global public subscriber identifier (GPSI) of the terminal.

Optionally, in this embodiment of this application, the slice subscription information of the third-party SP may further include NSSAI subscribed to by the third-party SP, and the NSSAI subscribed to by the third-party SP includes one or more pieces of S-NSSAI.

Optionally, in this embodiment of this application, the slice subscription information of the third-party SP may further include a second identifier, and the second identifier is used to indicate that mapping information between NSSAI allocated by different operators to the third-party SP is configured or managed by the third-party SP.

Optionally, in this embodiment of this application, after obtaining the slice subscription information of the third-party SP, the hUDR may store the slice subscription information of the third-party SP. The following provides several storage manners by way of example.

In a possible implementation, based on a specific implementation, the slice subscription information of the third-party SP may be stored in the hUDR as a record based on the NSSAI subscribed to by the third-party SP. For example, assuming that the NSSAI subscribed to by the third-party SP includes S-NSSAI 1, S-NSSAI 2, and S-NSSAI 2, the slice subscription information of the third-party SP may be shown in Table 1 and includes the NSSAI subscribed to by the third-party SP, the first identifier, and the second identifier.

TABLE 1

| NSSAI subscribed to by the third-party SP | First identifier | Second identifier |
|---|---|---|
| S-NSSAI 1 | Identifier a | Identifier b |
| S-NSSAI 2 | | |
| S-NSSAI 2 | | |

It should be noted that Table 1 is only an example table storage form, and there may be another table storage form or a non-table storage form. For example, as shown in Table 2, each piece of S-NSSAI in the NSSAI subscribed to by the third-party SP is separately and correspondingly stored with the first identifier and the second identifier. A storage form of the correspondence is not specifically limited in this embodiment of this application. This description is applicable to all embodiments of this application. This is collectively described herein and is not described in the following again.

TABLE 2

| NSSAI subscribed to by the third-party SP | First identifier | Second identifier |
|---|---|---|
| S-NSSAI 1 | Identifier a | Identifier b |
| S-NSSAI 2 | Identifier a | Identifier b |
| S-NSSAI 2 | Identifier a | Identifier b |

In another possible implementation, the slice subscription information of the third-party SP may alternatively be stored in subscription information of each terminal (which may also be referred to as communications service subscription information of the terminal) based on a specific implementation. For example, the foregoing information is added to an NSSAI record subscribed to by the terminal. For example, it is assumed that the hUDR currently stores subscription information of a terminal 1 and subscription information of a terminal 2, where the subscription information of the terminal 1 includes NSSAI subscribed to by the terminal 1, and the subscription information of the terminal 2 includes NSSAI subscribed to by the terminal 2. The NSSAI subscribed to by the terminal 1 includes the S-NSSAI 1 and the S-NSSAI 2, and the NSSAI subscribed to by the terminal 2 includes the S-NSSAI 2 and the S-NSSAI 2. A storage form of the slice subscription information of the third-party SP may be shown in Table 3 and Table 4.

TABLE 3

| Identifier of a terminal | NSSAI subscribed to by the terminal | First identifier | Second identifier |
|---|---|---|---|
| Identifier of the terminal 1 | S-NSSAI 1 S-NSSAI 2 | Identifier a | Identifier b |

TABLE 4

| Identifier of a terminal | NSSAI subscribed to by the terminal | First identifier | Second identifier |
|---|---|---|---|
| Identifier of a terminal 2 | S-NSSAI 2 S-NSSAI 2 | Identifier a | Identifier b |

It should be noted that this embodiment of this application merely provides examples of two storage manners of the slice subscription information of the third-party SP, and there may be another possible storage manner. This is not specifically limited in this embodiment of this application.

S402. The third-party device of the third-party SP sends slice mapping information of the third-party SP to the hUDR network element by using the NEF network element or the OAM device. Correspondingly, the hUDR network element receives the slice mapping information of the third-party SP that is sent by the third-party device by using the NEF network element or the OAM device.

That is, in this embodiment of this application, the third-party SP may separately subscribe to network slices, from different operators, that can provide same or similar communications services, and mapping information between S-NSSAI (that is, S-NSSAI subscribed to by the terminal) allocated by different operators to the network slices subscribed to by the third-party SP is managed by the third-party SP.

Optionally, in this embodiment of this application, after obtaining the slice mapping information of the third-party SP, the hUDR network element may store the slice mapping information of the third-party SP. In a possible implementation, the slice mapping information of the third-party SP may be stored, based on a specific implementation, as a correspondence among a network identifier (optional) of an operator to which the hUDR network element belongs, S-NSSAI allocated to a network slice by the operator to which the hUDR network element belongs, a network identifier of another operator, and S-NSSAI allocated to the network slice by the another operator.

For example, it is assumed that a network to which the hUDR network element belongs is a network of an operator 1, and the third-party SP subscribes to network slices, from the operator 1 and an operator 2, that can provide same or similar communications services. S-NSSAI allocated by the operator 1 to a network slice subscribed to by the third-party SP is S-NSSAI 1 and S-NSSAI allocated by the operator 2 to a network slice subscribed to by the third-party SP is S-NSSAI 4. Therefore, slice mapping information of the third-party SP may be shown in Table 5, and includes mapping information between NSSAI allocated by different operators to the third-party SP.

| Network identifier of an operator (optional) | NSSAI subscribed to by the third-party SP | Network identifier of an operator | NSSAI subscribed to by the third-party SP |
|---|---|---|---|
| Network identifier of the operator 1 | S-NSSAI 1 | Network identifier of the operator 2 | S-NSSAI 4 |

It should be noted that Table 5 merely provides an example of mapping information between NSSAI allocated by different operators to one network slice subscribed to by the third-party SP. When the third-party SP separately subscribes to a plurality of network slices from different operators, refer to Table 5 for mapping information between NSSAI allocated by different operators to each network slice subscribed to by the third-party SP. Details are not described herein again.

It should be noted that, in this embodiment of this application, step S402 is an optional step, that is, in this embodiment of this application, step S402 may not be performed. This is collectively described herein and is not described in the following again.

S403. The third-party device of the third-party SP sends the slice mapping information of the third-party SP to the vUDR network element by using the NEF network element or the OAM device. Correspondingly, the vUDR network element receives the slice mapping information of the third-party SP that is sent by the third-party device by using the NEF network element or the OAM device.

Optionally, in this embodiment of this application, the vUDR network element is a UDR network element in networks of all other operators that subscribe to the network slice, and there may be one or more vUDR network elements. For example, it may be learned from Table 5 that the other operators that subscribe to the network slice further include the operator 2. Herein, the vUDR network element includes a UDR network element in a network of the operator 2. This is collectively described herein and is not described in the following again.

Optionally, in this embodiment of this application, after obtaining the slice mapping information of the third-party SP, the vUDR network element may store the slice mapping information of the third-party SP. In a possible implementation, the slice mapping information of the third-party SP may be stored, based on a specific implementation, as a correspondence among a network identifier (optional) of an operator to which the vUDR network element belongs, S-NSSAI allocated to a network slice by the operator to which the vUDR network element belongs, a network identifier of another operator, and S-NSSAI allocated to the network slice by the another operator.

For example, according to Table 5, the slice mapping information of the third-party SP stored in the UDR network element in the network of the operator 2 may be shown in Table 6, and includes mapping information between NSSAI allocated by different operators to the third-party SP.

TABLE 6

| Network identifier of an operator (optional) | NSSAI subscribed to by the third-party SP | Network identifier of an operator | NSSAI subscribed to by the third-party SP |
|---|---|---|---|
| Network identifier of the operator 2 | S-NSSAI 4 | Network identifier of the operator 1 | S-NSSAI 1 |

It should be noted that in this embodiment of this application, each time after the third-party SP subscribes to a corresponding network slice from a new operator, the third-party device may add, at any time by using steps S402 and S403, the slice mapping information of the third-party SP to the UDR in networks of all operators that subscribe to the network slice. This is collectively described herein and is not described in the following again.

For example, it is assumed that the third-party SP subscribes to the network slice, from an operator 3, that can provide a same or similar communications service, and S-NSSAI allocated by the operator 3 to the network slice subscribed to by the third-party SP is S-NSSAI 7. Therefore, slice mapping information of the third-party SP stored on a UDR network element in a network of the operator 3 may be shown in Table 7, and includes mapping information between NSSAI allocated by different operators to the third-party SP.

TABLE 7

| Network identifier of an operator (optional) | NSSAI subscribed to by the third-party SP | Network identifier of an operator | NSSAI subscribed to by the third-party SP |
|---|---|---|---|
| Network identifier of the operator 3 | S-NSSAI 7 | Network identifier of the operator 2 | S-NSSAI 4 |
| Network identifier of the operator 3 | S-NSSAI 7 | Network identifier of the operator 1 | S-NSSAI 1 |

In addition, the slice mapping information of the third-party SP stored in the UDR network element in the network of the operator 1 is updated from that in Table 5 to that in Table 8, and mapping information of the S-NSSAI of the network slice subscribed to from the operator 3 and the S-NSSAI of the network slice subscribed to from the operator 1 is added.

TABLE 8

| Network identifier of an operator (optional) | NSSAI subscribed to by the third-party SP | Network identifier of an operator | NSSAI subscribed to by the third-party SP |
|---|---|---|---|
| Network identifier of the operator 1 | S-NSSAI 1 | Network identifier of the operator 2 | S-NSSAI 4 |
| Network identifier of the operator 1 | S-NSSAI 1 | Network identifier of the operator 3 | S-NSSAI 7 |

Similarly, the slice mapping information of the third-party SP stored in the UDR network element in the network of the operator 2 is updated from that in Table 6 to that in Table 9, and mapping information between the S-NSSAI of the network slice subscribed to from the operator 3 and the S-NSSAI of the network slice subscribed to from the operator 2 is added.

TABLE 9

| Network identifier of an operator (optional) | NSSAI subscribed to by the third-party SP | Network identifier of an operator | NSSAI subscribed to by the third-party SP |
|---|---|---|---|
| Network identifier of the operator 2 | S-NSSAI 4 | Network identifier of the operator 1 | S-NSSAI 1 |
| Network identifier of the operator 2 | S-NSSAI 4 | Network identifier of the operator 3 | S-NSSAI 7 |

It should be noted that, in steps S401 to S403, configuration of slice mapping information and slice subscription information of one third-party device is used as an example for description. When a plurality of third-party SPs subscribe to network slices, from different operators, that can provide same or similar communications services, refer to steps S401 to S403 for a manner of configuring slice mapping information and slice subscription information of a third-party device of each third-party SP. Details are not described herein again.

S404. The terminal sends a message a to an initial AMF network element. Correspondingly, the initial AMF network element receives the message from the terminal.

For example, as shown in FIG. 4A and FIG. 4B, the message a in this embodiment of this application may be a registration request message.

Optionally, the message a may carry NSSAI requested by the terminal. Alternatively, when the terminal roams into a VPLMN for the first time, if the terminal does not have VPLMN-related configured NSSAI, and does not know which network slices in the VPLMN can be requested to access, the message a may not carry the NSSAI requested by the terminal, or carry only standard S-NSSAI or nothing. This is not specifically limited in this embodiment of this application.

S405. The initial AMF network element obtains a subscription permanent identifier (SUPI) of the terminal or a subscription concealed identifier (SUCI) of the terminal, where the SUCI is an encrypted SUPI.

In this embodiment of this application, the initial AMF network element may obtain the SUPI of the terminal from an initial AMF network element last registered by the terminal, and may obtain the SUCI of the terminal from the terminal. For details, refer to an existing implementation, and details are not described herein.

In this embodiment of this application, the SUPI or the SUCI of the terminal is merely two example descriptions of the identifier of the terminal, and the identifier of the terminal may be another identifier. This is not specifically limited in this embodiment of this application.

S406. The terminal, the initial AMF network element, and an AUSF network element interact with each other to complete authentication on the terminal by a network and authentication on the network by the terminal. For details, refer to an existing implementation, and details are not described herein.

S407. The initial AMF network element sends a message b to the hUDR network element by using a UDM network element. Correspondingly, the hUDR network element receives the message b sent by the initial AMF network element to the hUDR network element by using the UDM network element. The message b carries the SUPI or the SUCI of the terminal and is used to request slice selection subscription data of the terminal.

For example, as shown in FIG. 4A and FIG. 4B, the message b in this embodiment of this application may be a slice selection subscription data request message.

In this embodiment of this application, the slice selection subscription data of the terminal may include the NSSAI subscribed to by the terminal and slice subscription information of n third-party SPs corresponding to the NSSAI subscribed to by the terminal. Slice subscription information of each third-party SP in the slice subscription information of the n third-party SPs includes a first identifier, the first identifier is used to search for mapping information that is managed by each third-party SP and that is of NSSAI allocated by different operators to the third-party SP, and n is a positive integer.

S408. The hUDR network element sends a message c to the initial AMF network element by using the UDM network element. Correspondingly, the initial AMF network element receives the message c sent by the hUDR network element to the initial AMF network element by using the UDM network element. The message c includes the SUPI or the SUCI of the terminal and the slice selection subscription data of the terminal.

For example, as shown in FIG. 4A and FIG. 4B, the message c in this embodiment of this application may be a slice selection subscription data response message.

The NSSAI subscribed to by the terminal in the slice selection subscription data of the terminal is included in subscription information of the terminal, and the slice subscription information of the n third-party SPs corresponding to the NSSAI subscribed to by the terminal and in the slice selection subscription data of the terminal is configured by the third-party device in step S401 above.

Based on a specific implementation, if the slice subscription information of the third-party SP is stored in the hUDR network element as a record based on the NSSAI subscribed to by the third-party SP, the hUDR network element first queries, based on the SUPI or the SUCI of the terminal, the S-NSSAI subscribed to by the terminal, and then obtains, through querying, the corresponding slice subscription information of the third-party SP based on the S-NSSAI subscribed to by the terminal.

Alternatively, based on a specific implementation, if the slice subscription information of the third-party SP is stored in subscription information of each terminal, the hUDR network element may directly obtain, through querying based on the SUPI or the SUCI of the terminal, the S-NSSAI subscribed to by the terminal and the corresponding subscription information of the third-party SP.

S409. The initial AMF network element sends a message d to an NSSF network element. Correspondingly, the NSSF network element receives the message d from the initial AMF network element. The message d includes the slice selection subscription data of the terminal, that is, the NSSAI subscribed to by the terminal and the slice subscription information of then third-party SPs corresponding to the NSSAI subscribed to by the terminal.

Optionally, if the message a in step S404 includes the NSSAI requested by the terminal, the message d may further include the NSSAI requested by the terminal. This is not specifically limited in this embodiment of this application.

For example, as shown in FIG. 4A and FIG. 4B, the message d in this embodiment of this application may be a slice selection request message.

S410. The NSSF network element sends a message e to the vUDR network element by using a vPCF network element. Correspondingly, the vUDR network element receives the message e sent by the NSSF network element to the vUDR network element by using the vPCF network element. The message e includes the first identifier and an identifier of an HPLMN of the terminal.

For example, as shown in FIG. 4A and FIG. 4B, the message e in this embodiment of this application may be a slice mapping request message.

Optionally, the message e may further include an identifier of a VPLMN to which the vPCF network element belongs.

Optionally, the message e may be directly sent by the NSSF network element to the vUDR network element without using the vPCF network element.

Optionally, the message e may further include specified one or more of the NSSAI subscribed to by the terminal.

Optionally, if the slice subscription information includes the second identifier, after receiving the message d, the NSSF network element may learn, based on the second identifier, that the mapping information between the NSSAI allocated by different operators to the third-party SP is configured or managed by the third-party SP, and may further send the message e to the vUDR network element by using the vPCF network element.

S411. The vUDR network element sends a message f to the NSSF network element by using the vPCF network element. Correspondingly, the NSSF network element receives the message f sent by the vUDR network element to the NSSF network element by using the vPCF network element. The message f includes first mapping information, and the first mapping information includes mapping information between NSSAI of the HPLMN of the terminal and NSSAI of the VPLMN of the terminal.

For example, as shown in FIG. 4A and FIG. 4B, the message f in this embodiment of this application may be a slice mapping response message.

The first mapping information is obtained by the vUDR network element by searching, based on the identifier of the HPLMN of the terminal and the identifier of the VPLMN of the terminal (optional), for the mapping information that is of NSSAI allocated by different operators to each third-party SP and that is configured by the third-party device in step S403.

For example, it is assumed that the HPLMN of the terminal is the network of the operator 1, and the VPLMN of the terminal is the network of the operator 2. Then, it may be learned from Table 9 that the first mapping information is mapping information between S-NSSAI 4 and S-NSSAI 1.

Optionally, if the message e may further include specified one or more of the NSSAI subscribed to by the terminal, in mapping information between the NSSAI of the HPLMN of the terminal and the NSSAI of the VPLMN of the terminal that is included in the first mapping information, the NSSAI of the HPLMN of the terminal is specified one or more of the NSSAI subscribed to by the terminal. In other words, the first mapping information is mapping information between specified one or more of the NSSAI subscribed to by the terminal and the NSSAI of the VPLMN of the terminal.

Optionally, if the message e does not pass through the vPCF network element, the message f may alternatively be directly sent by the vUDR network element to the NSSF network element.

S412. The NSSF network element determines allowed NSSAI for the terminal based on the NSSAI subscribed to by the terminal and the first mapping information, where the allowed NSSAI for the terminal is used to indicate one or more network slices that the terminal is allowed to access in the VPLMN of the terminal.

Optionally, in this embodiment of this application, if the NSSF network element cannot obtain the first mapping information, the mapping information between the NSSAI of the HPLMN of the terminal and the NSSAI of the VPLMN of the terminal may be determined based on a roaming agreement between the VPLMN and the HPLMN. This is not specifically limited in this embodiment of this application.

Optionally, in this embodiment of this application, when determining the allowed NSSAI for the terminal, the NSSF network element may further consider a support status of a network slice (v-SNSSAI) of an AMF set at a location of the terminal, that is, one or more pieces of S-NSSAI in the allowed NSSAI for the terminal are all S-NSSAI of a network slice supported by the AMF set at the location of the terminal.

Optionally, in this embodiment of this application, the NSSF network element may further determine, based on the NSSAI subscribed to by the terminal and the support status of the network slice (v-SNSSAI) of the AMF set at the location of the terminal, an identifier of the AMF set (AMF set id) that provides an access service for the terminal. This is not specifically limited in this embodiment of this application.

S413. The NSSF network element sends a message g to the initial AMF network element. Correspondingly, the initial AMF network element receives the message g from the NSSF network element. The message g includes the allowed NSSAI for the terminal and the first mapping information.

For example, as shown in FIG. 4A and FIG. 4B, the message g in this embodiment of this application may be a slice selection response message.

Optionally, the message g may further include the identifier of the AMF set (AMF set id) that provides the access service for the terminal.

Further, if the initial AMF network element determines that the initial AMF network element does not belong to the AMF set identified by the AMF set id, the following steps S414 to S416 are performed. Otherwise, the initial AMF network element itself serves as a current serving AMF network element of the terminal, and directly performs step S417.

S414. If determining that the initial AMF network element does not belong to the AMF set identified by the AMF set id, the initial AMF network element determines a target AMF from the AMF set identified by the AMF set id, as the current serving AMF network element of the terminal.

S415. The initial AMF network element forwards the message a to the target AMF network element. Correspondingly, the target AMF network element receives the message a from the initial AMF network element.

S416. The target AMF network element sends a message h to the terminal. Correspondingly, the terminal receives the message h from the target AMF network element. The message h includes the allowed NSSAI for the terminal and the first mapping information.

For example, as shown in FIG. 4A and FIG. 4B, the message h in this embodiment of this application may be a registration accept message.

S417. The initial AMF network element sends a message h to the terminal. Correspondingly, the terminal receives the message h from the initial AMF network element. The message h includes the allowed NSSAI for the terminal and the first mapping information.

For example, as shown in FIG. 4A and FIG. 4B, the message h in this embodiment of this application may be a registration accept message.

In this embodiment of this application, when one or more network slices that the terminal is allowed to access in the VPLMN of the terminal are determined, the NSSF network element may obtain the NSSAI subscribed to by the terminal and the slice subscription information of the n third-party SPs corresponding to the NSSAI subscribed to by the terminal, where the slice subscription information of each third-party SP in the slice subscription information of the n third-party SPs includes the first identifier; and the NSSF network element may obtain, based on the first identifier, the first mapping information corresponding to each third-party SP and determine the allowed NSSAI for the terminal based on the NSSAI subscribed to by the terminal and the first mapping information, where the allowed NSSAI is used to indicate the one or more network slices that the terminal is allowed to access in the VPLMN of the terminal. Mapping information between NSSAI allocated by different operators to each third-party SP is managed by the third-party SP. That is, based on the network slice selection method provided in this embodiment of this application, S-NSSAI valid in the VPLMN of the terminal and corresponding to the S-NSSAI subscribed to by the terminal may be obtained based on mapping information that is managed by each third-party SP and that is of NSSAI allocated to the third-party SP by different operators. Therefore, complex slice mapping management in an existing operator roaming agreement is simplified, and this enables the third-party SP to flexibly provide unified application service experience in areas covered by a plurality of operators when the third-party SP subscribes to slices from the plurality of operators.

Actions of the NSSF network element, the vUDR network element, the hUDR network element, or the UDM network element in steps S401 to S416 or steps S401 to S417 may be performed by the processor 301 in the communications device 300 shown in FIG. 3 by invoking application code stored in the memory 303. This is not limited in this embodiment.

Alternatively, optionally, the network architecture shown in FIG. 1 is applied to the 5G network shown in FIG. 2. An embodiment of this application may further provide a network slice selection method similar to that in the embodiment shown in FIG. 4A and FIG. 4B. For example, a difference is as follows: In the embodiment shown in FIG. 4A and FIG. 4B, after receiving the slice selection request message from the initial AMF network element, the NSSF network element sends the first identifier, the identifier of the HPLMN of the terminal, and the identifier of the VPLMN of the terminal (optional) to the vUDR network element, so as to request the first mapping information. However, in this embodiment of this application, after receiving the slice selection request message from the initial AMF network element, the NSSF network element may send the first identifier, the identifier of the VPLMN of the terminal, and the identifier of the HPLMN of the terminal (optional) to the hUDR network element so as to request the first mapping information. In this case, step S402 is a mandatory step, and step S403 is an optional step. For other related descriptions, refer to the embodiment shown in FIG. 4A and FIG. 4B. Details are not described again herein.

Figure 5A:
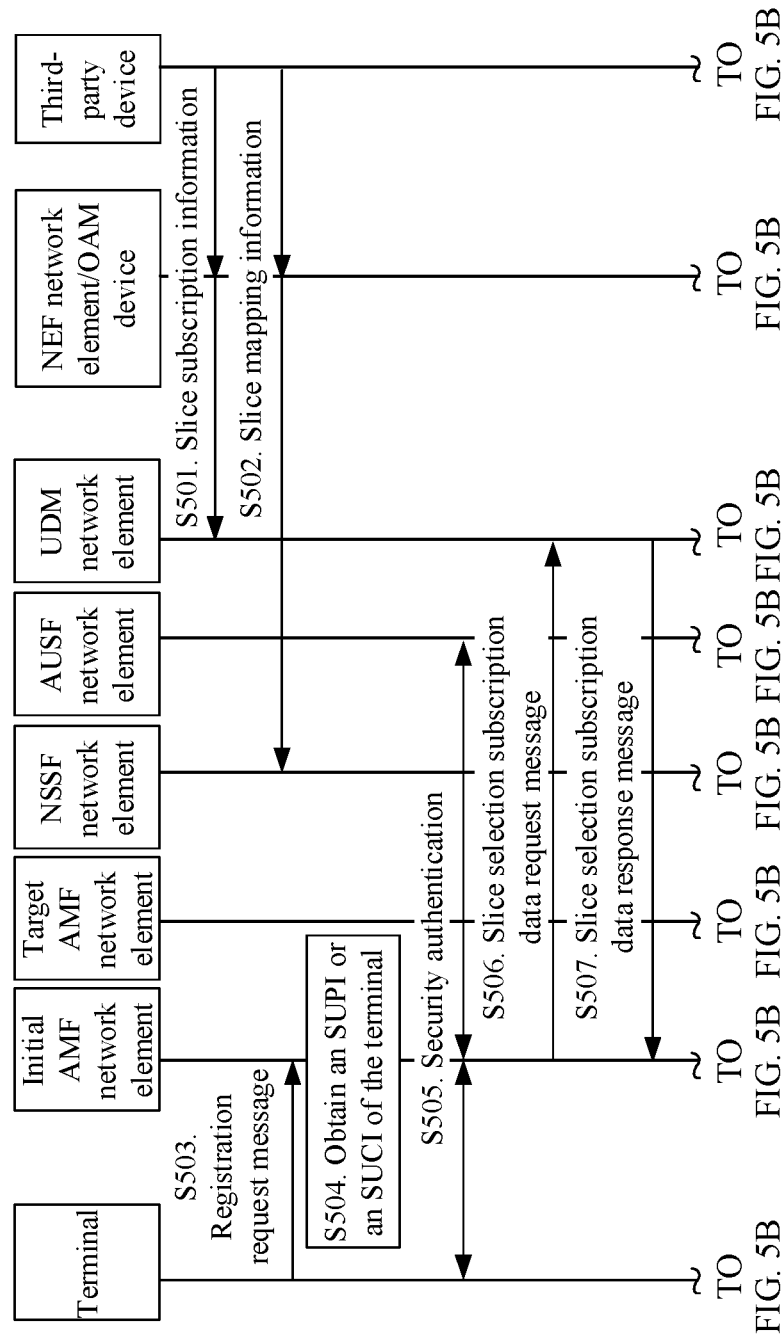
FIG. 5A and FIG. 5B are a schematic interaction flowchart 2 of a network slice selection method according to an embodiment of this application.
Figure 5B:
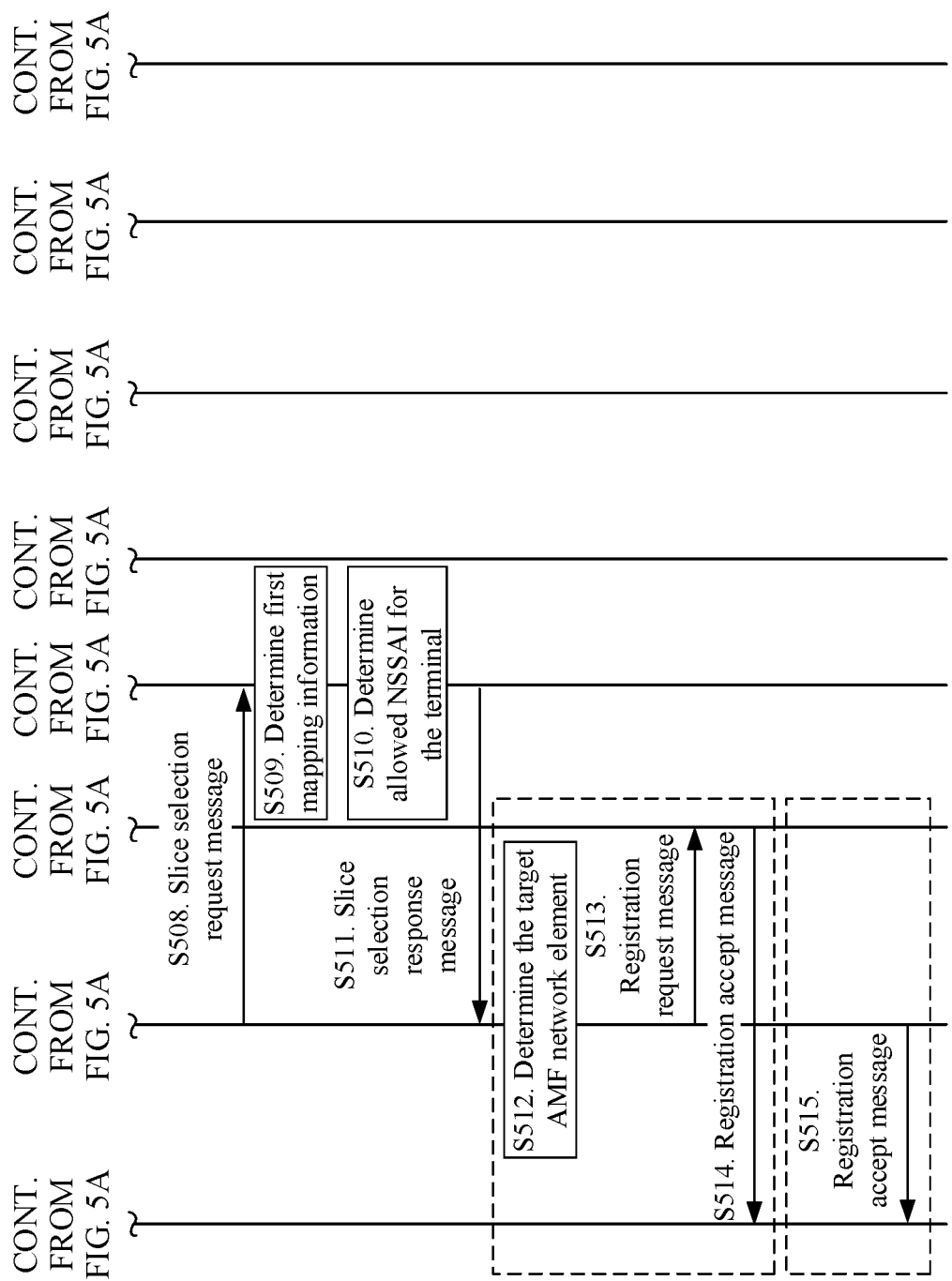

Alternatively, optionally, that the network architecture shown in FIG. 1 is applied to the 5G network shown in FIG. 2 is used as an example. FIG. 5A and FIG. 5B show another network slice selection method according to an embodiment of this application. The network slice selection method includes the following steps:

S501. A third-party device of a third-party SP sends slice subscription information of the third-party SP to a UDM network element by using an NEF network element or an OAM device. Correspondingly, the UDM network element receives the slice subscription information of the third-party SP that is sent by the third-party device by using the NEF network element or the OAM device.

For related descriptions of step S501, refer to step S401. A difference is, for example, replacing the hUDR network element in step S401 with the UDM network element in this embodiment of this application. Details are not described herein again.

In addition, the third-party device may directly communicate with the UDM network element, for example, directly send the slice subscription information of the third-party SP to the UDM network element. This is not specifically limited in this embodiment of this application.

Optionally, in this embodiment of this application, the UDM network element may further store address information of the third-party device for subsequent use when communicating with the third-party device. This is not specifically limited in this embodiment of this application.

S502. The third-party device of the third-party SP sends slice mapping information of the third-party SP to an NSSF network element by using the NEF network element or the OAM device. Correspondingly, the NSSF network element receives the slice mapping information of the third-party SP that is sent by the third-party device by using the NEF network element or the OAM device.

For related descriptions of step S502, refer to step S403. A difference is, for example, replacing the vUDR network element in step S403 with the NSSF network element in this embodiment of this application. Details are not described herein again.

S503 to S505 are the same as steps S404 to S406 in the embodiment shown in FIG. 4A. For related descriptions, refer to the embodiment shown in FIG. 4A and FIG. 4B. Details are not described herein again.

S506. The initial AMF network element sends a message b to the UDM network element. Correspondingly, the UDM network element receives the message b from the initial AMF network element. The message b carries the SUPI or the SUCI of the terminal and is used to request slice selection subscription data of the terminal. For related descriptions of the slice selection subscription data of the terminal, refer to step S407. Details are not described herein again.

For example, as shown in FIG. 5A, the message b in this embodiment of this application may be a slice selection subscription data request message.

S507. The UDM network element sends a message c to the initial AMF network element. Correspondingly, the initial AMF network element receives the message c from the UDM network element. The message c includes the SUPI or the SUCI of the terminal and the slice selection subscription data of the terminal.

For example, as shown in FIG. 5A, the message c in this embodiment of this application may be a slice selection subscription data response message.

The NSSAI subscribed to by the terminal in the slice selection subscription data of the terminal is included in subscription information of the terminal, and the slice subscription information of the n third-party SPs corresponding to the NSSAI subscribed to by the terminal and in the slice selection subscription data of the terminal is configured by the third-party device in step S501 above.

Based on a specific implementation, if the slice subscription information of the third-party SP is stored in the UDM network element as a record based on the NSSAI subscribed to by the third-party SP, the UDM network element first queries, based on the SUPI or the SUCI of the terminal, the S-NSSAI subscribed to by the terminal and then obtains, through querying, the corresponding slice subscription information of the third-party SP based on the S-NSSAI subscribed to by the terminal.

Alternatively, based on a specific implementation, if the slice subscription information of the third-party SP is stored in subscription information of each terminal, the UDM network element may directly obtain, through querying based on the SUPI or the SUCI of the terminal, the S-NSSAI subscribed to by the terminal and the corresponding slice subscription information of the third-party SP.

S508. The initial AMF network element sends a message d to the NSSF network element. Correspondingly, the NSSF network element receives the message d from the initial AMF network element. The message d includes the slice selection subscription data of the terminal and an identifier of an HPLMN of the terminal, and the slice selection subscription data of the terminal includes the NSSAI subscribed to by the terminal and the slice subscription information of the n third-party SPs corresponding to the NSSAI subscribed to by the terminal.

For example, as shown in FIG. 5B, the message d in this embodiment of this application may be a slice selection request message.

Optionally, if the message a in step S503 includes the NSSAI requested by the terminal, the message d may further include the NSSAI requested by the terminal. This is not specifically limited in this embodiment of this application.

S509. The NSSF network element determines first mapping information based on a first identifier and the identifier of the HPLMN of the terminal, where the first mapping information includes NSSAI of the HPLMN of the terminal and NSSAI of a VPLMN of the terminal.

Optionally, in this embodiment of this application, the NSSF network element may query, based on the first identifier, the identifier of the HPLMN of the terminal, and an identifier of the HPLMN of the terminal (optional), locally stored mapping information between NSSAI allocated by different operators to each third-party SP, to obtain the first mapping information.

Optionally, if the slice subscription information includes the second identifier, after receiving the message d, the NSSF network element may learn, based on the second identifier, that mapping information between the NSSAI allocated by different operators to the third-party SP is configured or managed by the third-party SP and then determine the first mapping information based on the first identifier and the identifier of the HPLMN of the terminal.

S510 and S511 are the same as steps S412 and S413 in the embodiment shown in FIG. 4B. For related descriptions, refer to the embodiment shown in FIG. 4A and FIG. 4B. Details are not described herein again.

Further, if the initial AMF network element determines that the initial AMF network element does not belong to the AMF set identified by the AMF set id, the following steps S512 to S514 are performed. Otherwise, the initial AMF network element itself serves as a current serving AMF network element of the terminal, and directly performs step S515.

S512 to S514 are the same as steps S414 to S416 in the embodiment shown in FIG. 4B. For related descriptions, refer to the embodiment shown in FIG. 4A and FIG. 4B. Details are not described herein again.

S515 is the same as step S417 in the embodiment shown in FIG. 4B. For related descriptions, refer to the embodiment shown in FIG. 4A and FIG. 4B. Details are not described herein again.

Based on the network slice selection method provided in this embodiment of this application, complex slice mapping management in an existing operator roaming agreement can be simplified, and this enables the third-party SP to flexibly provide unified application service experience in areas covered by a plurality of operators when the third-party SP subscribes to slices from the plurality of operators. For related technical effect analysis, refer to the embodiment shown in FIG. 4A and FIG. 4B. Details are not described herein again.

Actions of the NSSF network element or the UDM network element in steps S501 to S514 or steps S501 to S515 may be performed by the processor 301 in the communications device 300 shown in FIG. 3 by invoking application code stored in the memory 303. This is not limited in this embodiment.

Figure 6A:
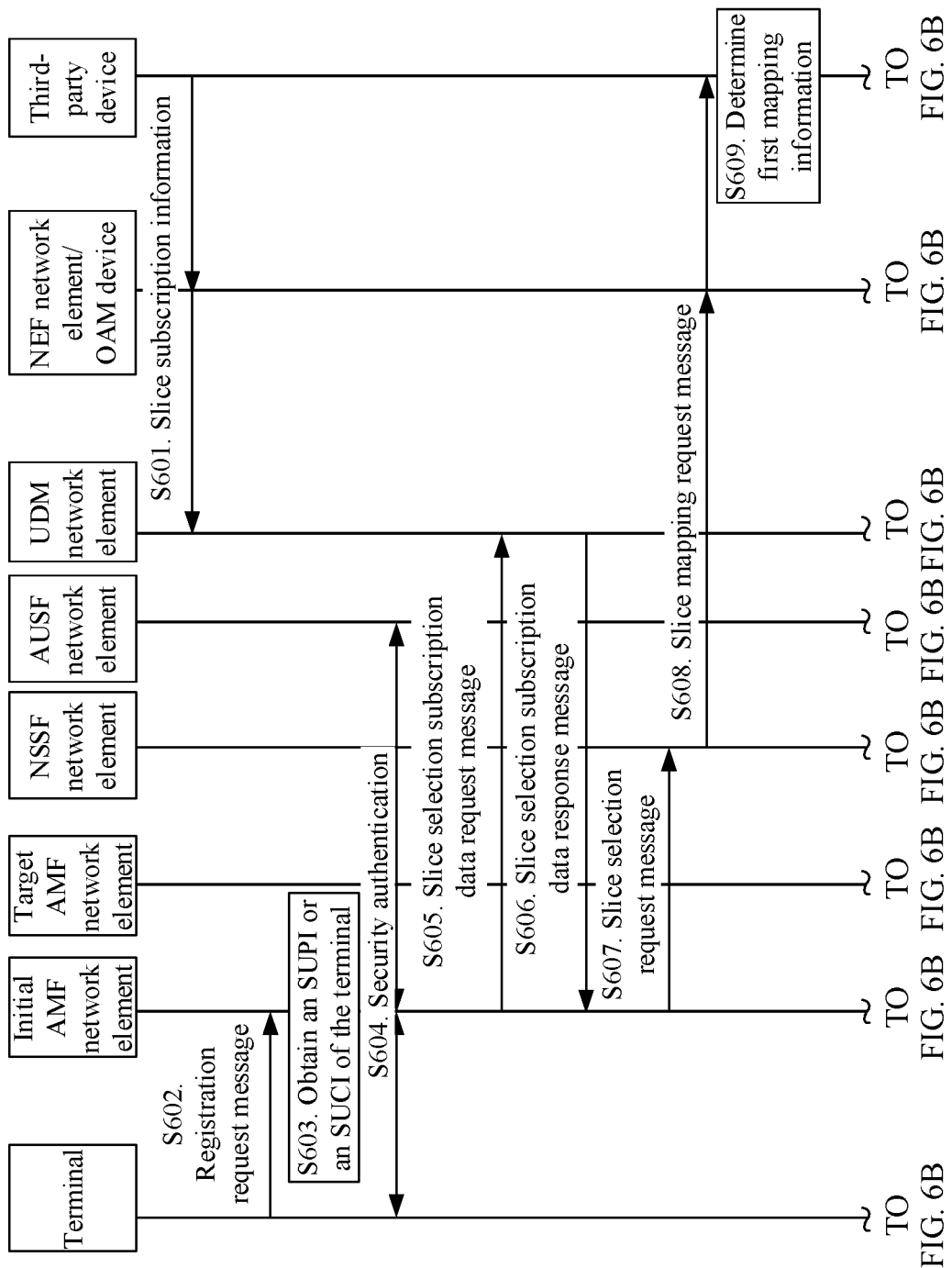
FIG. 6A and FIG. 6B are a schematic interaction flowchart 3 of a network slice selection method according to an embodiment of this application.
Figure 6B:
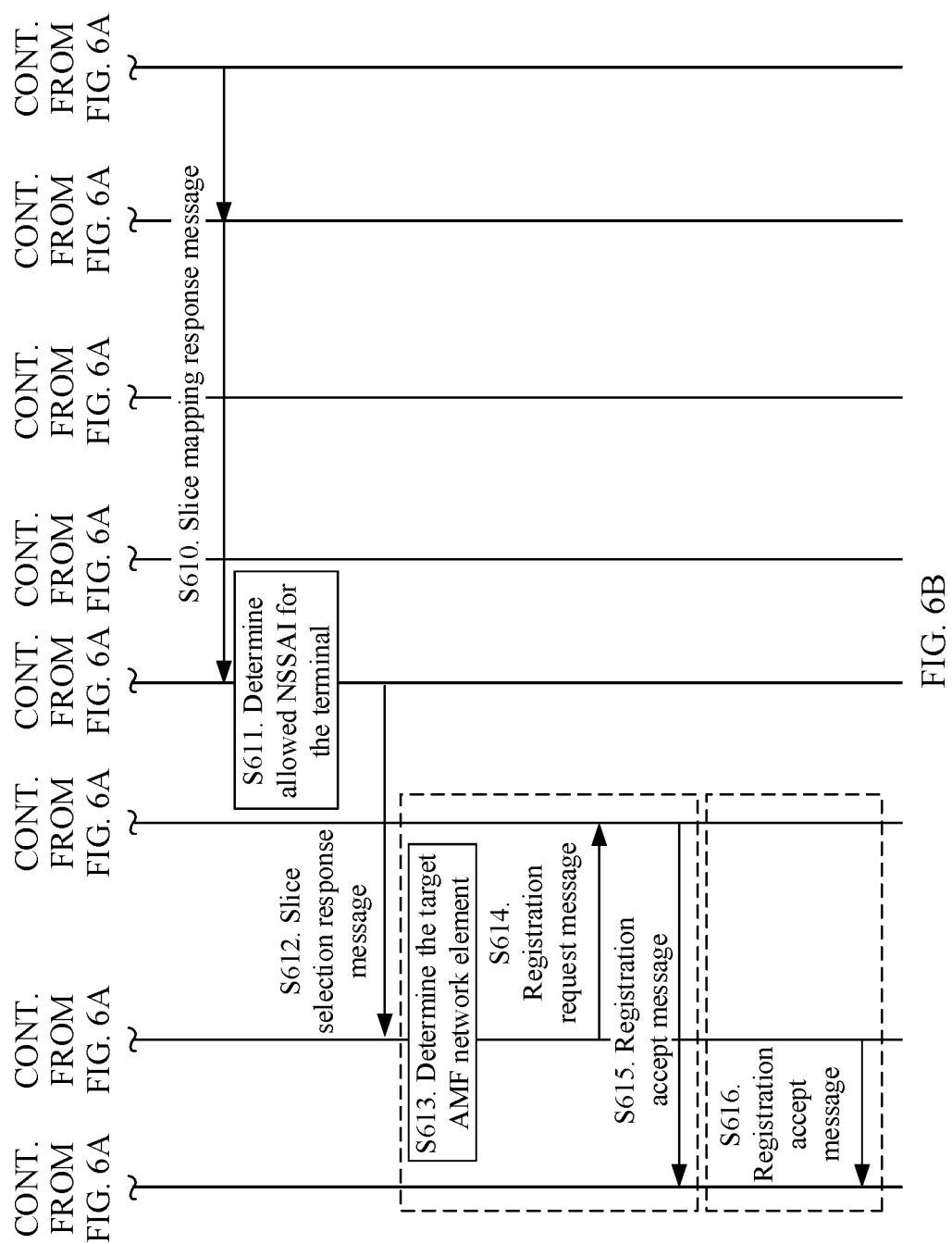

Alternatively, optionally, that the network architecture shown in FIG. 1 is applied to the 5G network shown in FIG. 2 is used as an example. FIG. 6A and FIG. 6B show another network slice selection method according to an embodiment of this application. The network slice selection method includes the following steps:

S601 is the same as step S501 in the embodiment shown in FIG. 5A. For related descriptions, refer to the embodiment shown in FIG. 5A and FIG. 5B. Details are not described herein again.

S602 to S606 are the same as steps S503 to S507 in the embodiment shown in FIG. 5A. For related descriptions, refer to the embodiment shown in FIG. 5A and FIG. 5B. Details are not described herein again.

In addition, optionally, in this embodiment of this application, the message c may further include address information of third-party devices of the n third-party SPs corresponding to the NSSAI subscribed to by the terminal.

S607. The initial AMF network element sends a message d to the NSSF network element. Correspondingly, the NSSF network element receives the message d from the initial AMF network element. The message d includes the slice selection subscription data of the terminal and an identifier of an HPLMN of the terminal, and the slice selection subscription data of the terminal includes the NSSAI subscribed to by the terminal and the slice subscription information of the n third-party SPs corresponding to the NSSAI subscribed to by the terminal.

For example, as shown in FIG. 6A, the message d in this embodiment of this application may be a slice selection request message.

Optionally, if the message a in step S602 includes the NSSAI requested by the terminal, the message d may further include the NSSAI requested by the terminal. This is not specifically limited in this embodiment of this application.

Optionally, in this embodiment of this application, if the message c may further include the address information of the third-party devices of the n third-party SPs corresponding to the NSSAI subscribed to by the terminal, the message d may further include the address information of the third-party devices of the n third-party SPs.

Further, after receiving the message d from the initial AMF network element, the NSSF network element needs to request mapping information between NSSAI of the HPLMN of the terminal and NSSAI of the VPLMN of the terminal from the third-party devices of the n third-party SPs. For example, the following uses interaction between any third-party device in the third-party devices of the n third-party SPs and the UDM network element for description, and the network slice selection method provided in this embodiment of this application may further include the following steps S608 to S610:

S608. Based on address information of a third-party device, the NSSF network element sends a message m to the corresponding third-party device by using the NEF network element or the OAM device. Correspondingly, the third-party device receives the message m sent by the NSSF network element by using the NEF network element or the OAM device. The message m includes a first identifier, the identifier of the HPLMN of the terminal, and the identifier of the VPLMN of the terminal.

For example, as shown in FIG. 6A, the message m in this embodiment of this application may be a slice mapping request message.

Optionally, the message m may further include specified one or more of the NSSAI subscribed to by the terminal.

Optionally, in this embodiment of this application, the address information of the third-party device may be included in the message d and then sent to the UDM network element, or may be obtained by the UDM network element by using a domain name server (DNS) based on a device identifier of the third-party device in the first identifier. This is not specifically limited in this embodiment of this application.

Optionally, if the slice subscription information includes the second identifier, after receiving the message d, the NSSF network element may learn, based on the second identifier, that the mapping information between the NSSAI allocated by different operators to the third-party SP is configured or managed by the third-party SP, and may further send the message m to the third-party device network element.

S609. The third-party device determines first mapping information based on the first identifier, the identifier of the HPLMN of the terminal, and the identifier of the VPLMN of the terminal, where the first mapping information includes mapping information between NSSAI of the HPLMN of the terminal and NSSAI of the VPLMN of the terminal.

Optionally, in this embodiment of this application, the third-party device may query, based on the first identifier, the identifier of the HPLMN of the terminal, and the identifier of the VPLMN of the terminal, locally stored mapping information between NSSAI allocated by different operators to each third-party SP, to obtain the first mapping information.

S610. The third-party device sends a message n to the NSSF network element by using the NEF network element or the OAM device. Correspondingly, the NSSF network element receives the message n sent by the third-party device to the NSSF network element by using the NEF network element or the OAM device. The message n includes first mapping information, and the first mapping information includes mapping information between NSSAI of the HPLMN of the terminal and NSSAI of the VPLMN of the terminal.

For example, as shown in FIG. 6B, the message n in this embodiment of this application may be a slice mapping response message.

Optionally, if the message m may further include specified one or more of the NSSAI subscribed to by the terminal, in mapping information between the NSSAI of the HPLMN of the terminal and the NSSAI of the VPLMN of the terminal that is included in the first mapping information, the NSSAI of the HPLMN of the terminal is specified one or more of the NSSAI subscribed to by the terminal. In other words, the first mapping information is mapping information between specified one or more of the NSSAI subscribed to by the terminal and the NSSAI of the VPLMN of the terminal.

S611 and S612 are the same as steps S412 and S413 in the embodiment shown in FIG. 4B. For related descriptions, refer to the embodiment shown in FIG. 4A and FIG. 4B. Details are not described herein again.

It should be noted that the first mapping information required when the allowed NSSAI for the terminal is determined in step S611 is the first mapping information that is obtained from the third-party devices of the n third-party SPs and that is summarized by the NSSF network element. This is collectively described herein and is not described in the following again.

Further, if the initial AMF network element determines that the initial AMF network element does not belong to the AMF set identified by the AMF set id, the following steps S613 to S615 are performed. Otherwise, the initial AMF network element itself serves as a current serving AMF network element of the terminal, and directly performs step S515.

S613 to S615 are the same as steps S414 to S416 in the embodiment shown in FIG. 4B. For related descriptions, refer to the embodiment shown in FIG. 4A and FIG. 4B. Details are not described herein again.

S616 is the same as step S417 in the embodiment shown in FIG. 4B. For related descriptions, refer to the embodiment shown in FIG. 4A and FIG. 4B. Details are not described herein again.

Based on the network slice selection method provided in this embodiment of this application, complex slice mapping management in an existing operator roaming agreement can be simplified, and this enables the third-party SP to flexibly provide unified application service experience in areas covered by a plurality of operators when the third-party SP subscribes to slices from the plurality of operators. For related technical effect analysis, refer to the embodiment shown in FIG. 4A and FIG. 4B. Details are not described herein again.

Actions of the NSSF network element, the UDM network element, or the third-party device in steps S601 to S615 or steps S601 to S616 may be performed by the processor 301 in the communications device 300 shown in FIG. 3 by invoking application code stored in the memory 303. This is not limited in this embodiment.

In another possible implementation, a second network device sends a first message to a third-party device of a third SP, where the first message includes a first identifier, a network identifier of a home network of a terminal, and a network identifier of a visited network of the terminal, and the first identifier is used to search for mapping information that is managed by the third-party SP and that is of NSSAI allocated by different operators to the third-party SP. After receiving the first message from the second network device, the third-party device determines, based on the first identifier, the network identifier of the home network of the terminal, and the network identifier of the visited network of the terminal, first mapping information corresponding to the third-party SP and sends the first mapping information to the second network device, where the first mapping information includes mapping information between NSSAI of the home network of the terminal and NSSAI of the visited network of the terminal. The following provides several possible implementations by way of example as follows:

Optionally, if the second network device is a network slice selection function network element, for a possible implementation, refer to the embodiment shown in FIG. 6A and FIG. 6B. Details are not described herein again.

Figure 7A:
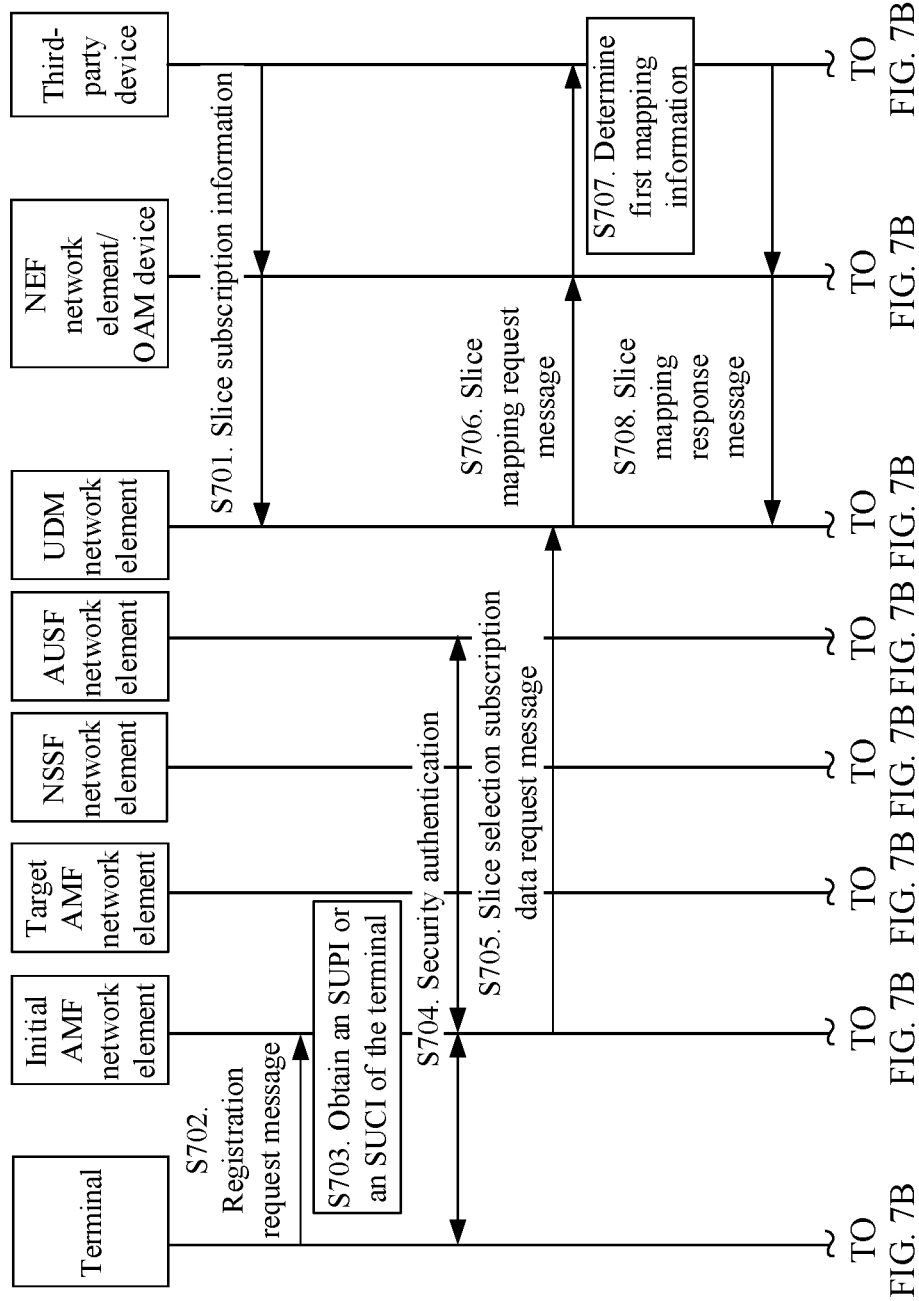

Alternatively, optionally, if the second network device is a unified data management network element, that the network architecture shown in FIG. 1 is applied to the 5G network shown in FIG. 2 is used as an example, and FIG. 7A and FIG. 7B show a network slice selection method according to an embodiment of this application. The network slice selection method includes the following steps:

S701 to S705 are the same as steps S601 to S605 in the embodiment shown in FIG. 6A. For related descriptions, refer to the embodiment shown in FIG. 6A and FIG. 6B. Details are not described herein again.

After the UDM network element receives the message b from the initial AMF network element, on one hand, the UDM network element may determine slice selection subscription data of the terminal. For specific implementation, refer to step S507 in the embodiment shown in FIG. 5A. Details are not described herein again. On the other hand, the UDM network element needs to request mapping information between NSSAI of an HPLMN of the terminal and NSSAI of a VPLMN of the terminal from third-party devices of n third-party SPs. For example, the following uses interaction between any third-party device in the third-party devices of the n third-party SPs and the UDM network element for description, and the network slice selection method provided in this embodiment of this application may further include the following steps S706 to S708:

S706. Based on address information of a third-party device, the UDM network element sends a message p to the corresponding third-party device by using the NEF network element or the OAM device. Correspondingly, the third-party device receives the message p sent by the UDM network element by using the NEF network element or the OAM device. The message p includes a first identifier, the identifier of the HPLMN of the terminal, and the identifier of the VPLMN of the terminal.

For example, as shown in FIG. 7A, the message p in this embodiment of this application may be a slice mapping request message.

Optionally, the message p may further include specified one or more of the NSSAI subscribed to by the terminal.

Optionally, in this embodiment of this application, the address information of the third-party device may be obtained by the UDM network element by querying a DNS based on a device identifier of the third-party device in the first identifier, or may be stored by the UDM network element in step S701. This is not specifically limited in this embodiment of this application.

Optionally, if the slice subscription information includes the second identifier, the UDM network element may learn, based on the second identifier, that the mapping information between the NSSAI allocated by different operators to the third-party SP is configured or managed by the third-party SP and may further send the message m to the third-party device network element.

S707. The third-party device determines first mapping information based on the first identifier, the identifier of the HPLMN of the terminal, and the identifier of the VPLMN of the terminal, where the first mapping information includes mapping information between NSSAI of the HPLMN of the terminal and NSSAI of the VPLMN of the terminal.

Optionally, in this embodiment of this application, the third-party device may query, based on the first identifier, the identifier of the HPLMN of the terminal, and the identifier of the VPLMN of the terminal, locally stored mapping information between NSSAI allocated by different operators to each third-party SP, to obtain the first mapping information.

S708. The third-party device sends a message q to the UDM network element by using the NEF network element or the OAM device. Correspondingly, the UDM network element receives the message q sent by the third-party device to the UDM network element by using the NEF network element or the OAM device. The message q includes the first mapping information.

For example, as shown in FIG. 7A, the message q in this embodiment of this application may be a slice mapping response message.

Optionally, if the message p may further include specified one or more of the NSSAI subscribed to by the terminal, in mapping information between the NSSAI of the HPLMN of the terminal and the NSSAI of the VPLMN of the terminal that is included in the first mapping information, the NSSAI of the HPLMN of the terminal is specified one or more of the NSSAI subscribed to by the terminal. In other words, the first mapping information is mapping information between specified one or more of the NSSAI subscribed to by the terminal and the NSSAI of the VPLMN of the terminal.

S709. The UDM network element sends a message c to the initial AMF network element. Correspondingly, the initial AMF network element receives the message c from the UDM network element. The message c includes a SUPI or a SUCI of the terminal, slice selection subscription data of the terminal, and first mapping information obtained from third-party devices of the n third-party SPs.

For example, as shown in FIG. 7B, the message c in this embodiment of this application may be a slice selection subscription data response message.

S710. The initial AMF network element sends a message d to the NSSF network element. Correspondingly, the NSSF network element receives the message d from the initial AMF network element. The message d includes the slice selection subscription data of the terminal and the first mapping information.

For example, as shown in FIG. 7B, the message d in this embodiment of this application may be a slice selection request message.

Optionally, if the message a in step S702 includes the NSSAI requested by the terminal, the message d may further include the NSSAI requested by the terminal. This is not specifically limited in this embodiment of this application.

S711 and S712 are the same as steps S412 and S413 in the embodiment shown in FIG. 4B. For related descriptions, refer to the embodiment shown in FIG. 4A and FIG. 4B. Details are not described herein again.

Further, if the initial AMF network element determines that the initial AMF network element does not belong to the AMF set identified by the AMF set id, the following steps S713 to S715 are performed. Otherwise, the initial AMF network element itself serves as a current serving AMF network element of the terminal, and directly performs step S716.

S713 to S715 are the same as steps S414 to S416 in the embodiment shown in FIG. 4B. For related descriptions, refer to the embodiment shown in FIG. 4A and FIG. 4B. Details are not described herein again.

S716 is the same as step S417 in the embodiment shown in FIG. 4B. For related descriptions, refer to the embodiment shown in FIG. 4A and FIG. 4B. Details are not described herein again.

Based on the network slice selection method provided in this embodiment of this application, complex slice mapping management in an existing operator roaming agreement can be simplified, and this enables the third-party SP to flexibly provide unified application service experience in areas covered by a plurality of operators when the third-party SP subscribes to slices from the plurality of operators. For related technical effect analysis, refer to the embodiment shown in FIG. 4A and FIG. 4B. Details are not described herein again.

Actions of the NSSF network element, the UDM network element, or the third-party device in steps S701 to S715 or steps S701 to S716 may be performed by the processor 301 in the communications device 300 shown in FIG. 3 by invoking application code stored in the memory 303. This is not limited in this embodiment.

Figure 8A:
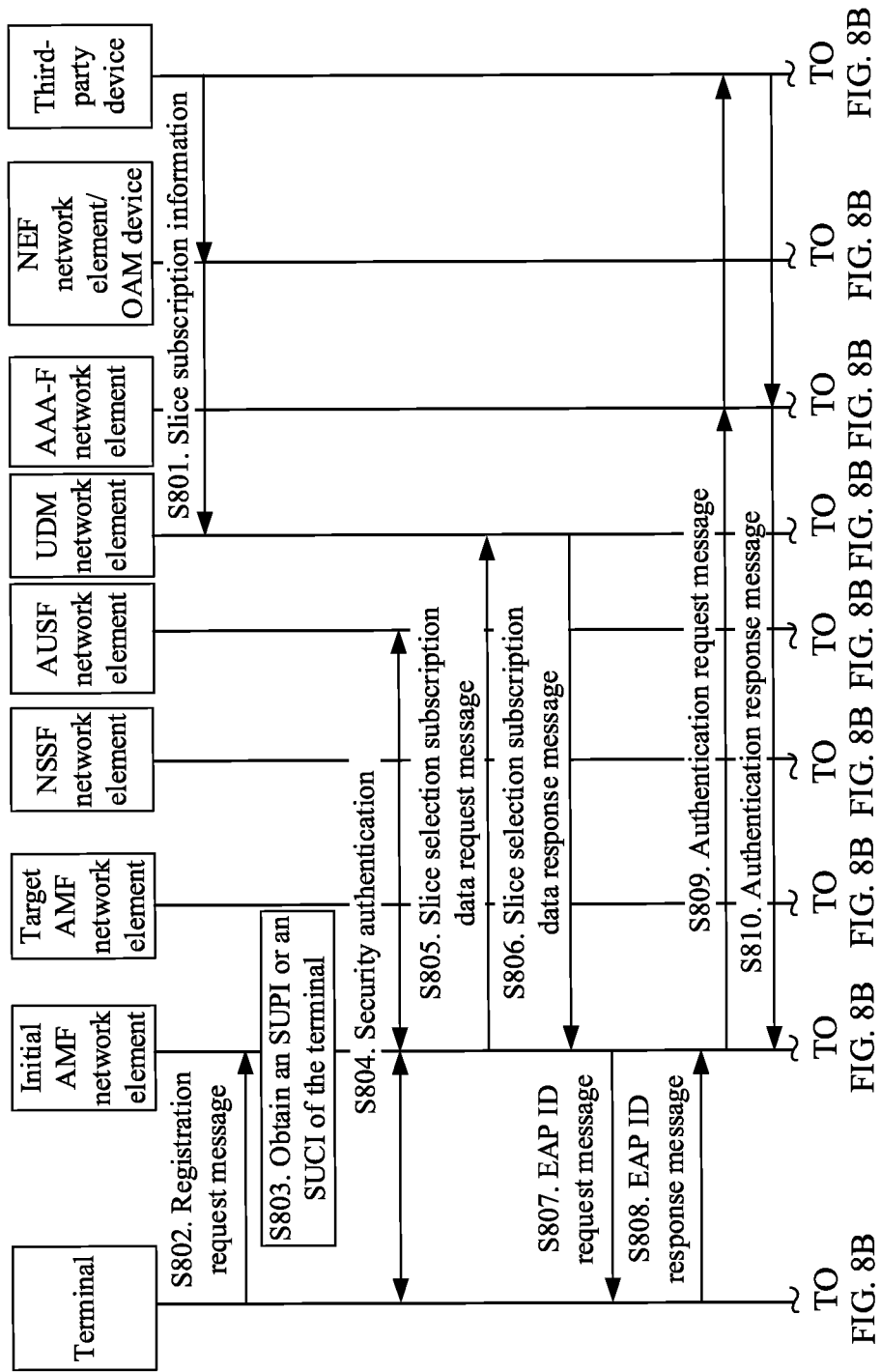
FIG. 8A and FIG. 8B are a schematic interaction flowchart 5 of a network slice selection method according to an embodiment of this application.
Figure 8B:
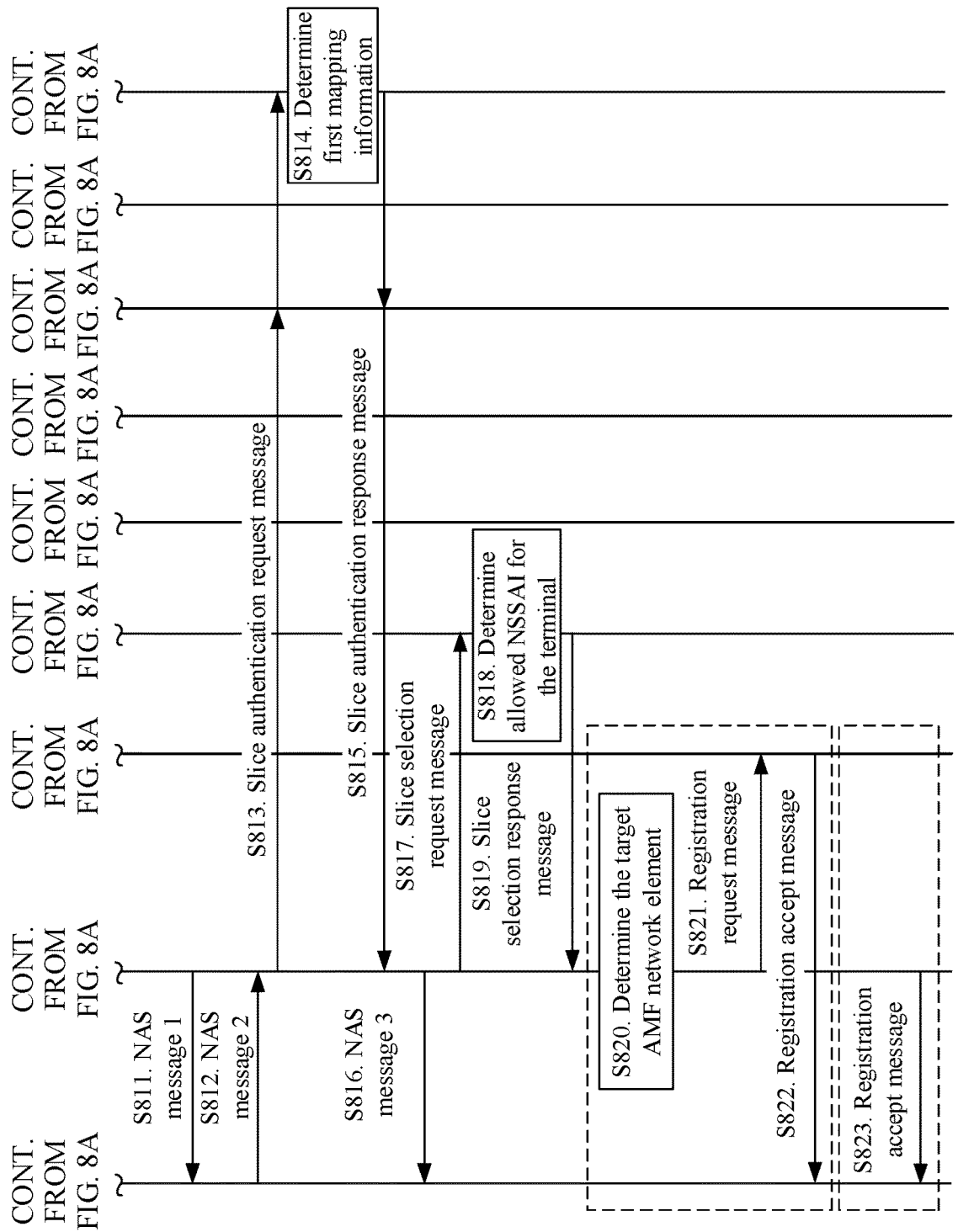

Alternatively, optionally, if the second network device is an authentication, authorization, and accounting proxy function network element, that the network architecture shown in FIG. 1 is applied to the 5G network shown in FIG. 2 is used as an example, and FIG. 8A and FIG. 8B show a network slice selection method according to an embodiment of this application. The network slice selection method includes the following steps:

S801. A third-party device of a third-party SP sends slice subscription information of the third-party SP to a UDM network element by using an NEF network element or an OAM device. Correspondingly, the UDM network element receives the slice subscription information of the third-party SP that is sent by the third-party device by using the NEF network element or the OAM device.

In this embodiment of this application, the slice subscription information of the third-party SP includes one or more of a first identifier or a second identifier; and a third-party authentication identifier. For related descriptions of the first identifier or the second identifier, refer to step S401 in the embodiment shown in FIG. 4A and FIG. 4B. Details are not described herein again.

Optionally, the third-party device in this embodiment of this application may be a third-party authentication authorization accounting-server (AAA-S), and the AAA-S stores information related to slice access authentication.

S802 to S806 are the same as steps S503 to S507 in the embodiment shown in FIG. 5A. For related descriptions, refer to the embodiment shown in FIG. 5A and FIG. 5B. Details are not described herein again.

In this case, the initial AMF network element may obtain one or more of the first identifier or the second identifier by performing step S806.

Optionally, the message c in step S806 may further include address information of third-party devices of the n third-party SPs corresponding to the NSSAI subscribed to by the terminal.

S807. The initial AMF network element sends a message r to the terminal based on the third-party authentication identifier. Correspondingly, the terminal receives the message r from the initial AMF network element. The message r carries one or more of the NSSAI subscribed to by the terminal so as to request a terminal identity used for third-party authentication used when corresponding network slice access authentication is performed.

For example, as shown in FIG. 8A, the message r in this embodiment of this application may be an extensible authentication protocol identifier (EAP ID) request message.

For example, the terminal identity used for third-party authentication may be an EAP ID.

S808. The terminal sends a message s to the initial AMF network element. Correspondingly, the initial AMF network element receives the message s from the terminal. The message s includes the terminal identity used for third-party authentication.

For example, as shown in FIG. 8A, the message s in this embodiment of this application may be an EAP ID response message.

S809. The initial AMF network element sends a message t to the third-party device by using an authentication authorization accounting proxy function (AAA-F) network element. Correspondingly, the third-party device receives the message t sent by the initial AMF network element to the third-party device by using the AAA-F network element. The message t includes the terminal identity used for third-party authentication.

For example, as shown in FIG. 8A, the message t in this embodiment of this application may be an authentication request message.

S810. The third-party device sends a message u to the initial AMF network element by using the AAA-F network element. Correspondingly, the initial AMF network element receives the message u sent by the third-party device to the initial AMF network element by using the AAA-F network element. The message u includes an EAP authentication challenge request from a network for the terminal.

For example, as shown in FIG. 8A, the message u in this embodiment of this application may be an authentication response message.

S811. The initial AMF network element sends a message v to the terminal. Correspondingly, the terminal receives the message v from the initial AMF network element. The message v includes the EAP authentication challenge request from the network for the terminal and S-NSSAI of a network slice that needs to be authenticated.

For example, as shown in FIG. 8B, the message v in this embodiment of this application may be a non-access stratum (NAS) message 1.

S812. The terminal sends a message w to the initial AMF network element. Correspondingly, the initial AMF network element receives the message w from the terminal. The message w includes an EAP authentication challenge response from the network for the terminal and the S-NSSAI of the network slice that needs to be authenticated.

For example, as shown in FIG. 8B, the message w in this embodiment of this application may be a NAS message 2.

S813. The initial AMF network element sends a message x to the third-party device by using the AAA-F network element. Correspondingly, the third-party device receives the message x sent by the initial AMF network element to the third-party device by using the AAA-F network element.

For example, as shown in FIG. 8B, the message x in this embodiment of this application may be a slice authentication request message.

In a possible implementation, if step S801 includes the first identifier, the message x includes the EAP authentication challenge response from the network for the terminal, an identifier of the HPLMN of the terminal, an identifier of the VPLMN of the terminal, and the first identifier in step S801. Optionally, the message x may further include S-NSSAI of a network slice that requires access authentication or the second identifier.

In another possible implementation, if step S801 does not include the first identifier, the message x includes the EAP authentication challenge response from the network for the terminal, the identifier of the HPLMN of the terminal, the identifier of the VPLMN of the terminal, and the second identifier in step S801. Optionally, the message x may further include the S-NSSAI of the network slice that requires access authentication or the terminal identity used for third-party authentication.

S814. After determining that an EAP authentication challenge from the network for the terminal succeeds, the third-party device determines first mapping information based on the identifier of the HPLMN of the terminal and the identifier of the VPLMN of the terminal with reference to the first identifier, where the first mapping information includes mapping information between NSSAI of the HPLMN of the terminal and NSSAI of the VPLMN of the terminal.

Optionally, when obtaining only the second identifier, the third-party device may use the terminal identity used for third-party authentication as the first identifier.

Optionally, in this embodiment of this application, the third-party device may query, based on the identifier of the HPLMN of the terminal and the identifier of the VPLMN of the terminal with reference to the first identifier, locally stored mapping information between NSSAI allocated by different operators to each third-party SP, to obtain the first mapping information.

S815. The third-party device sends a message y to the initial AMF network element by using the AAA-F network element. Correspondingly, the initial AMF network element receives the message y sent by the third-party device to the initial AMF network element by using the AAA-F network element. The message y includes EAP authentication success information and the first mapping information.

For example, as shown in FIG. 8B, the message y in this embodiment of this application may be a slice authentication response message.

Optionally, if the message x may further include specified S-NSSAI of a network slice that requires access authentication, in mapping information between the NSSAI of the HPLMN of the terminal and the NSSAI of the VPLMN of the terminal that is included in the first mapping information, the NSSAI of the VPLMN of the terminal is the specified S-NSSAI that needs to be authenticated to access the network slice. In other words, the first mapping information is mapping information between the specified S-NSSAI of the network slice that requires access authentication and the S-NSSAI of the HPLMN of the terminal.

S816. The initial AMF network element sends a message z to the terminal. Correspondingly, the terminal receives the message z from the initial AMF network element. The message z includes the EAP authentication success information.

For example, as shown in FIG. 8B, the message z in this embodiment of this application may be a NAS message 3, and the NAS message 3 may be an EAP authentication success message.

Steps S809 to S816 are described by using interaction between any third-party device in the third-party devices of the n third-party SPs and the initial AMF network element as an example. When a plurality of third-party devices exist, for interaction between each third-party device and the initial AMF network element, refer to steps S809 to S816. Details are not described herein again.

S817 to S819 are the same as steps S710 to S712 in the embodiment shown in FIG. 7B. For related descriptions, refer to the embodiment shown in FIG. 7A and FIG. 7B. Details are not described herein again.

Further, if the initial AMF network element determines that the initial AMF network element does not belong to the AMF set identified by the AMF set id, the following steps S820 to S822 are performed. Otherwise, the initial AMF network element itself serves as a current serving AMF network element of the terminal, and directly performs step S823.

S820 to S822 are the same as steps S713 to S715 in the embodiment shown in FIG. 7B. For related descriptions, refer to the embodiment shown in FIG. 7A and FIG. 7B. Details are not described herein again.

S823 is the same as step S716 in the embodiment shown in FIG. 7B. For related descriptions, refer to the embodiment shown in FIG. 4A and FIG. 4B. Details are not described herein again.

Based on the network slice selection method provided in this embodiment of this application, complex slice mapping management in an existing operator roaming agreement can be simplified, and this enables the third-party SP to flexibly provide unified application service experience in areas covered by a plurality of operators when the third-party SP subscribes to slices from the plurality of operators. For related technical effect analysis, refer to the embodiment shown in FIG. 4A and FIG. 4B. Details are not described herein again.

Actions of the NSSF network element, the UDM network element, or the third-party device in steps S801 to S822 or steps S801 to S823 may be performed by the processor 301 in the communications device 300 shown in FIG. 3 by invoking application code stored in the memory 303. This is not limited in this embodiment.

Figure 9:
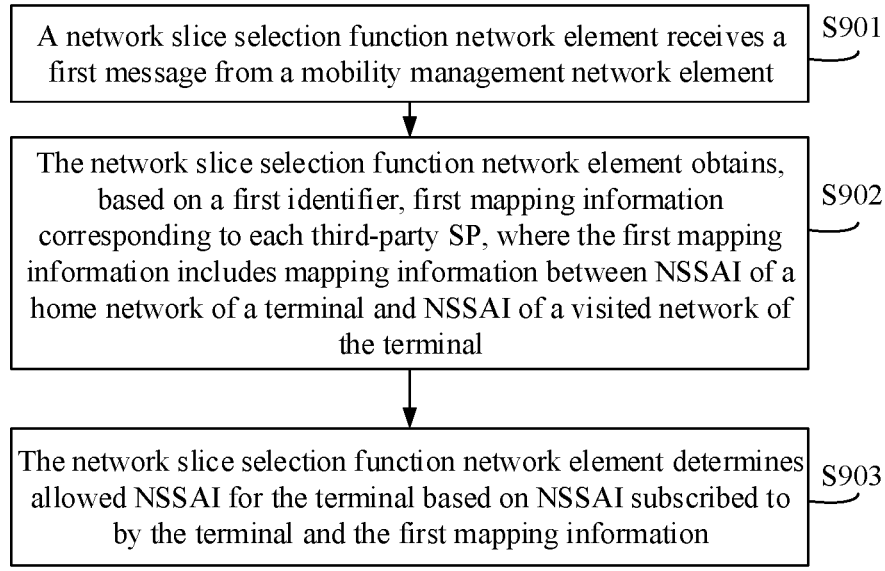
FIG. 9 is a schematic flowchart 1 of a network slice selection method according to an embodiment of this application.

In conclusion, therefore, an embodiment of this application discloses a network slice selection method. As shown in FIG. 9, the method includes the following steps S901 to S903:

S901. A network slice selection function network element receives a first message from a mobility management network element, where the first message includes NSSAI subscribed to by a terminal and slice subscription information of n third-party SPs corresponding to the NSSAI subscribed to by the terminal, slice subscription information of each third-party SP in the slice subscription information of the n third-party SPs includes a first identifier, the first identifier is used to search for mapping information that is managed by each third-party SP and that is of NSSAI allocated by different operators to the third-party SP, and n is a positive integer.

S902. The network slice selection function network element obtains, based on the first identifier, first mapping information corresponding to each third-party SP, where the first mapping information includes mapping information between NSSAI of a home network of the terminal and NSSAI of a visited network of the terminal.

S903. The network slice selection function network element determines allowed NSSAI for the terminal based on the NSSAI subscribed to by the terminal and the first mapping information, where the allowed NSSAI for the terminal is used to indicate one or more network slices that the terminal is allowed to access in the visited network of the terminal.

In the network slice selection method, for example, for operations of the network slice selection function network element, refer to operations of the NSSF network element in the embodiment shown in FIG. 4A and FIG. 4B, FIG. 5A and FIG. 5B or FIG. 6A and FIG. 6B and related text descriptions. Details are not described herein again. For example, step S901 may be specifically implemented by using step S409 in FIG. 4B, step S508 in FIG. 5B, or step S607 in FIG. 6A. Step S902 may be specifically implemented by using steps S410 and S411 in FIG. 4B, step S509 in FIG. 5B, or steps S608 to S610 in FIG. 6A and FIG. 6B. Step S903 may be specifically implemented by using step S412 in FIG. 4B, step S510 in FIG. 5B, or step S611 in FIG. 6B.

Figure 10:
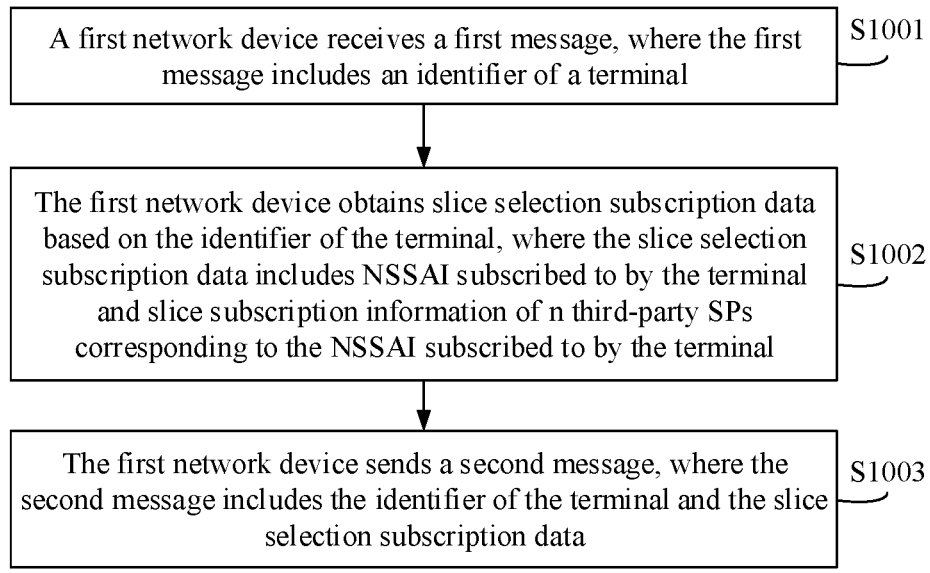
FIG. 10 is a schematic flowchart 2 of a network slice selection method according to an embodiment of this application.

In addition, an embodiment of this application further discloses a network slice selection method. As shown in FIG. 10, the method includes the following steps S1001 to S1003:

S1001. A first network device receives a first message, where the first message includes an identifier of a terminal.

S1002. The first network device obtains slice selection subscription data based on the identifier of the terminal, where the slice selection subscription data includes NSSAI subscribed to by the terminal and slice subscription information of n third-party SPs corresponding to the NSSAI subscribed to by the terminal, slice subscription information of each third-party SP in the slice subscription information of the n third-party SPs includes a first identifier, the first identifier is used to search for mapping information that is managed by each third-party SP and that is of NSSAI allocated by different operators to the third-party SP, and n is a positive integer.

S1003. The first network device sends a second message, where the second message includes the identifier of the terminal and the slice selection subscription data.

In the network slice selection method, for example, for operations of the first network device, refer to operations of the UDM network element in any one of embodiments shown in FIG. 4A to FIG. 8B and related text descriptions; or for operations of the first network device, refer to operations of the hUDR network element in the embodiment shown in FIG. 4A and FIG. 4B and related text descriptions. Details are not described herein again. For example, steps S1001 to S1003 may be specifically implemented by using steps S407 and S408 in FIG. 4A, steps S506 and S507 in FIG. 5A, steps S605 and S606 in FIG. 6A, steps S705 and S709 in FIG. 7A and FIG. 7B, or steps S805 and S806 in FIG. 8A.

Figure 11:
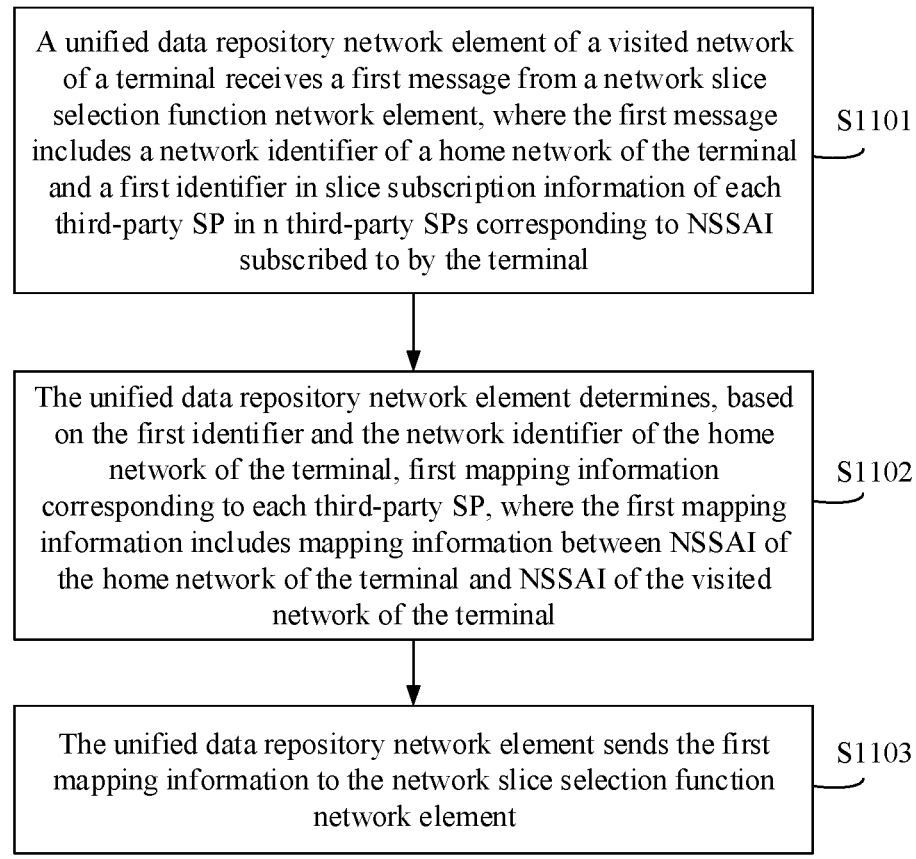
FIG. 11 is a schematic flowchart 3 of a network slice selection method according to an embodiment of this application.

In addition, an embodiment of this application further discloses a network slice selection method. As shown in FIG. 11, the method includes the following steps S1101 to S1103:

S1101. A unified data repository network element of a visited network of a terminal receives a first message from a network slice selection function network element, where the first message includes a network identifier of a home network of the terminal and a first identifier in slice subscription information of each third-party SP in n third-party SPs corresponding to NSSAI subscribed to by the terminal, and the first identifier is used to search for mapping information that is managed by each third-party SP and that is of NSSAI allocated by different operators to the third-party SP.

S1102. The unified data repository network element determines, based on the first identifier and the network identifier of the home network of the terminal, first mapping information corresponding to each third-party SP, where the first mapping information includes mapping information between NSSAI of the home network of the terminal and NSSAI of the visited network of the terminal.

S1103. The unified data repository network element sends the first mapping information to the network slice selection function network element.

In the network slice selection method, for example, for operations of the unified data repository network element, refer to operations of the vUDM network element in the embodiment shown in FIG. 4A and FIG. 4B and related text descriptions. Details are not described herein again. For example, steps S1101 to S1103 may be specifically implemented by using steps S410 and S411 in FIG. 4B.

The foregoing mainly describes the solutions provided in the embodiments of this application from a perspective of interaction between network elements. It may be understood that, to implement the foregoing functions, the network slice selection function network element, the unified data management network element, the unified data repository network element of the home network of the terminal, the unified data repository network element of the visited network of the terminal, or the third-party device includes a corresponding hardware structure and/or software module for executing each function. A person skilled in the art should easily be aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network slice selection function network element, the unified data management network element, the unified data repository network element of the home network of the terminal, the unified data repository network element of the visited network of the terminal, or the third-party device may be divided into functional modules based on the foregoing method examples. For example, each functional module may be divided correspondingly based on each function, or two or more functions may be integrated into one processing module. The integrated module may be implemented in a form of hardware, or may be implemented in a form of a software functional module. It should be noted that, in this embodiment of this application, division into the modules is an example, and is merely logical function division. In actual implementation, another division manner may be used.

Figure 12:
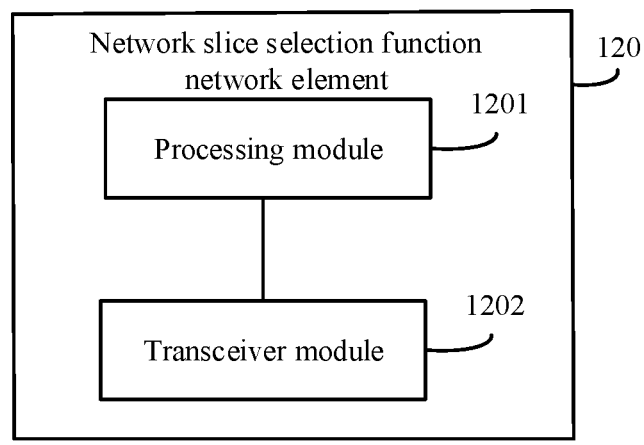
FIG. 12 is a schematic structural diagram of a network slice selection function network element according to an embodiment of this application.

For example, when functional modules are divided in an integrated manner, FIG. 12 is a schematic structural diagram of a network slice selection function network element 120. The network slice selection function network element 120 includes a transceiver module 1202 and a processing module 1201. The transceiver module 1202 is configured to receive a first message from a mobility management network element, where the first message includes NSSAI subscribed to by a terminal and slice subscription information of n third-party SPs corresponding to the NSSAI subscribed to by the terminal, slice subscription information of each third-party SP in the slice subscription information of the n third-party SPs includes a first identifier, the first identifier is used to search for mapping information that is managed by each third-party SP and that is of NSSAI allocated by different operators to the third-party SP, and n is a positive integer. The processing module 1201 is configured to obtain, based on the first identifier, first mapping information corresponding to each third-party SP, where the first mapping information includes mapping information between NSSAI of a home network of the terminal and NSSAI of a visited network of the terminal. The processing module 1201 is further configured to determine allowed NSSAI for the terminal based on the NSSAI subscribed to by the terminal and the first mapping information, where the allowed NSSAI is used to indicate one or more network slices that the terminal is allowed to access in the visited network of the terminal.

Optionally, the first message further includes a network identifier of the home network of the terminal; and that the processing module 1201 is configured to obtain, based on the first identifier, first mapping information corresponding to each third-party SP includes: configured to send a second message to a unified data repository network element of the visited network of the terminal, where the second message includes the first identifier and the network identifier of the home network of the terminal; and receive the first mapping information from the unified data repository network element of the visited network of the terminal.

Optionally, the first message further includes a network identifier of the home network of the terminal; and that the processing module 1201 is configured to obtain, based on the first identifier, first mapping information corresponding to each third-party SP includes: configured to query, based on the first identifier and with reference to the network identifier of the home network of the terminal, locally stored mapping information between NSSAI allocated by different operators to each third-party SP, to obtain the first mapping information.

Optionally, the first message further includes a network identifier of the home network of the terminal; and that the processing module 1201 is configured to obtain, based on the first identifier, first mapping information corresponding to each third-party SP includes: configured to send a third message to a third-party device of each third-party SP, where the third message includes the first identifier, the network identifier of the home network of the terminal, and a network identifier of the visited network of the terminal; and receive the first mapping information from the third-party device of each third-party SP.

All content related to the steps in the foregoing method embodiments may be cited in function description of corresponding functional modules, and details are not described herein again.

In this embodiment, the network slice selection function network element 120 is presented in a form of dividing functional modules through integration. The "module" herein may be an ASIC, a circuit, a processor and a memory that execute one or more software or firmware programs, an integrated logic circuit, and/or another component that can provide the foregoing functions. In a simple embodiment, a person skilled in the art may figure out that the network slice selection function network element 120 may use the form shown in FIG. 3.

For example, the processor 301 in FIG. 3 may invoke a computer executable instruction stored in the memory 303 so that the network slice selection function network element 120 executes the network slice selection method in the foregoing method embodiment.

Specifically, the functions/implementation processes of the transceiver module 1202 and the processing module 1201 in FIG. 12 may be implemented by the processor 301 in FIG. 3 by invoking the computer executable instruction stored in the memory 303. Alternatively, the function/implementation process of the processing module 1201 in FIG. 12 may be implemented by the processor 301 in FIG. 3 by invoking the computer executable instruction stored in the memory 303, and the function/implementation process of the transceiver module 1202 in FIG. 12 may be implemented by the communications interface 304 in FIG. 3.

Because the network slice selection function network element 120 provided in this embodiment can execute the foregoing network slice selection method, for a technical effect that can be obtained by the network slice selection function network element 120, refer to the foregoing method embodiment, and details are not described herein again.

Optionally, an embodiment of this application further provides an apparatus (for example, the apparatus may be a chip system). The apparatus includes a processor, configured to support a network slice selection function network element in implementing the foregoing network slice selection method, for example, obtaining, based on the first identifier, first mapping information corresponding to each third-party SP. In a possible design, the apparatus further includes a memory. The memory is configured to store a program instruction and data that are necessary for the network slice selection function network element. Certainly, the memory may alternatively not be in the apparatus. When the apparatus is a chip system, the apparatus may include a chip, or may include a chip and another discrete component. This is not specifically limited in this embodiment of this application.

Figure 13:
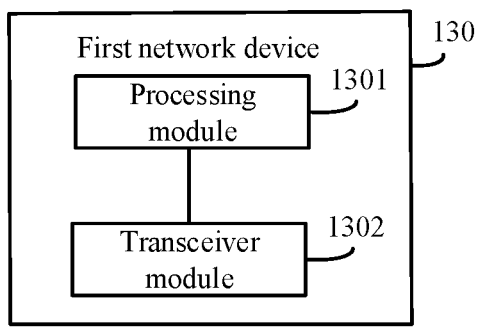
FIG. 13 is a schematic structural diagram of a first network device according to an embodiment of this application.

Alternatively, for example, when functional modules are divided in an integrated manner, FIG. 13 is a schematic structural diagram of a first network device 130. The first network device 130 includes a transceiver module 1302 and a processing module 1301. The transceiver module 1302 is configured to receive a first message, where the first message includes an identifier of a terminal; and the processing module 1301 is configured to obtain slice selection subscription data based on the identifier of the terminal, where the slice selection subscription data includes NSSAI subscribed to by the terminal and slice subscription information of n third-party SPs corresponding to the NSSAI subscribed to by the terminal, slice subscription information of each third-party SP in the slice subscription information of the n third-party SPs includes a first identifier, the first identifier is used to search for mapping information that is managed by each third-party SP and that is of NSSAI allocated by different operators to the third-party SP, and n is a positive integer. The transceiver module 1302 is further configured to send a second message, where the second message includes the identifier of the terminal and the slice selection subscription data.

Optionally, the first network device 130 is a unified data management network element or a unified data repository network element of a home network of the terminal.

Optionally, that the processing module 1301 is configured to obtain slice selection subscription data based on the identifier of the terminal includes: configured to determine, based on the identifier of the terminal, the NSSAI subscribed to by the terminal; and determine the first identifier based on the NSSAI subscribed to by the terminal and n first correspondences, where each first correspondence in the n first correspondences includes a correspondence between the first identifier and NSSAI subscribed to by each third-party SP, and the NSSAI subscribed to by each third-party SP includes one or more of the NSSAI subscribed to by the terminal.

Optionally, the transceiver module 1302 is further configured to send a fourth message to a third-party device of each third-party SP, where the fourth message includes the first identifier, a network identifier of a home network of the terminal, and a network identifier of a visited network of the terminal. The transceiver module 1302 is further configured to receive first mapping information corresponding to each third-party SP from a third-party device of the third-party SP, where the first mapping information includes mapping information between NSSAI of the home network of the terminal and NSSAI of the visited network of the terminal.

Optionally, the first network device 130 is a unified data management network element; and that the processing module 1301 is configured to obtain slice selection subscription data based on the identifier of the terminal includes: configured to send a third message to a unified data repository network element of a home network of the terminal, where the third message includes the identifier of the terminal and is used to request the slice selection subscription data; and receive the slice selection subscription data from the unified data repository network element.

All content related to the steps in the foregoing method embodiments may be cited in function description of corresponding functional modules, and details are not described herein again.

In this embodiment, the first network device 130 is presented in a form of dividing functional modules through integration. The "module" herein may be an ASIC, a circuit, a processor and a memory that execute one or more software or firmware programs, an integrated logic circuit, and/or another component that can provide the foregoing functions. In a simple embodiment, a person skilled in the art may figure out that the first network device 130 may use the form shown in FIG. 3.

For example, the processor 301 in FIG. 3 may invoke a computer executable instruction stored in the memory 303 so that the first network device 130 executes the network slice selection method in the foregoing method embodiment.

Specifically, the functions/implementation processes of the transceiver module 1302 and the processing module 1301 in FIG. 13 may be implemented by the processor 301 in FIG. 3 by invoking the computer executable instruction stored in the memory 303. Alternatively, the function/implementation process of the processing module 1301 in FIG. 13 may be implemented by the processor 301 in FIG. 3 by invoking the computer executable instruction stored in the memory 303, and the function/implementation process of the transceiver module 1302 in FIG. 13 may be implemented by the communications interface 304 in FIG. 3.

Because the first network device 130 provided in this embodiment can execute the foregoing network slice selection method, for a technical effect that can be obtained by the first network device 130, refer to the foregoing method embodiment, and details are not described herein again.

Optionally, an embodiment of this application further provides an apparatus (for example, the apparatus may be a chip system). The apparatus includes a processor, configured to support a first network device in implementing the foregoing network slice selection method, for example, obtaining slice selection subscription data based on an identifier of the terminal. In a possible design, the apparatus further includes a memory. The memory is configured to store a program instruction and data that are necessary for the first network device. Certainly, the memory may alternatively not be in the apparatus. When the apparatus is a chip system, the apparatus may include a chip, or may include a chip and another discrete component. This is not specifically limited in this embodiment of this application.

Figure 14:
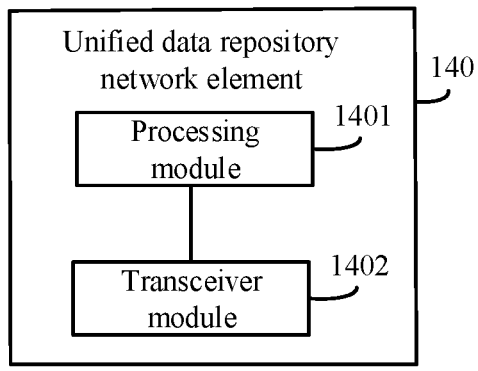
FIG. 14 is a schematic structural diagram of a unified data repository network element according to an embodiment of this application.

Alternatively, for example, when functional modules are divided in an integrated manner, FIG. 14 is a schematic structural diagram of a unified data repository network element 140. The unified data repository network element 140 is a unified data repository network element of a visited network of a terminal and includes a transceiver module 1402 and a processing module 1401. The transceiver module 1402 is configured to receive a first message from a network slice selection function network element, where the first message includes a network identifier of a home network of the terminal and a first identifier in slice subscription information of each third-party SP in n third-party SPs corresponding to NSSAI subscribed to by the terminal, and the first identifier is used to search for mapping information that is managed by each third-party SP and that is of NSSAI allocated by different operators to the third-party SP; the processing module 1401 is configured to determine, based on the first identifier and the network identifier of the home network of the terminal, first mapping information corresponding to each third-party SP, where the first mapping information includes mapping information between NSSAI of the home network of the terminal and NSSAI of the visited network of the terminal; and the transceiver module 1402 is further configured to send the first mapping information to the network slice selection function network element.

Optionally, that the processing module 1401 is configured to determine, based on the first identifier and the network identifier of the home network of the terminal, first mapping information corresponding to each third-party SP includes: configured to: determine the first mapping information based on the first identifier and the network identifier of the home network of the terminal, and query locally stored mapping information between NSSAI allocated by different operators to each third-party SP, to obtain the first mapping information.

Optionally, the transceiver module 1402 is further configured to receive mapping information between NSSAI allocated by different operators to each third-party SP from a third-party device of the third-party SP.

All content related to the steps in the foregoing method embodiments may be cited in function description of corresponding functional modules, and details are not described herein again.

In this embodiment, the unified data repository network element 140 is presented in a form of dividing functional modules through integration. The "module" herein may be an ASIC, a circuit, a processor and a memory that execute one or more software or firmware programs, an integrated logic circuit, and/or another component that can provide the foregoing functions. In a simple embodiment, a person skilled in the art may figure out that the unified data repository network element 140 may use the form shown in FIG. 3.

For example, the processor 301 in FIG. 3 may invoke a computer executable instruction stored in the memory 303 so that the unified data repository network element 140 executes the network slice selection method in the foregoing method embodiment.

Specifically, the functions/implementation processes of the transceiver module 1402 and the processing module 1401 in FIG. 14 may be implemented by the processor 301 in FIG. 3 by invoking the computer executable instruction stored in the memory 303. Alternatively, the function/implementation process of the processing module 1401 in FIG. 14 may be implemented by the processor 301 in FIG. 3 by invoking the computer executable instruction stored in the memory 303, and the function/implementation process of the transceiver module 1402 in FIG. 14 may be implemented by the communications interface 304 in FIG. 3.

Because the unified data repository network element 140 provided in this embodiment can execute the foregoing network slice selection method, for a technical effect that can be obtained by the unified data repository network element 140, refer to the foregoing method embodiment, and details are not described herein again.

Optionally, an embodiment of this application further provides an apparatus (for example, the apparatus may be a chip system). The apparatus includes a processor, configured to support a unified data repository network element in implementing the foregoing network slice selection method, for example, determining, based on a first identifier and a network identifier of a home network of a terminal, first mapping information corresponding to each third-party SP. In a possible design, the apparatus further includes a memory. The memory is configured to store a program instruction and data that are necessary for the unified data repository network element. Certainly, the memory may alternatively not be in the apparatus. When the apparatus is a chip system, the apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement other variations of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the accompanying claims and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A network slice selection method, wherein the method comprises:
   receiving, by a network slice selection function network element, a first message from a mobility management network element, wherein the first message comprises network slice selection assistance information (NSSAI) subscribed to by a terminal and slice subscription information of n third-party service providers (SPs) corresponding to the NSSAI subscribed to by the terminal, slice subscription information of a third-party SP in the slice subscription information of the n third-party SPs comprises a first identifier, the first identifier is used to search for mapping information of a plurality of NSSAIs, each of the plurality of NSSAIs is allocated by a different operator to the third-party SP, the mapping information is managed by the third-party SP, and n is a positive integer;
   obtaining, by the network slice selection function network element based on the first identifier, first mapping information corresponding to the third-party SP, wherein the first mapping information comprises mapping information between NSSAI of a home network of the terminal and NSSAI of a visited network of the terminal; and
   determining, by the network slice selection function network element, allowed NSSAI for the terminal based on the NSSAI subscribed to by the terminal and the first mapping information, wherein the allowed NSSAI is used to indicate one or more network slices that the terminal is allowed to access in the visited network of the terminal.

2. The method according to claim 1, wherein the first identifier comprises at least one of a third-party identifier of the third-party SP or a device identifier of a third-party device of the third-party SP.

3. The method according to claim 1, wherein the first message further comprises a network identifier of the home network of the terminal, and wherein the obtaining, by the network slice selection function network element based on the first identifier, first mapping information corresponding to the third-party SP comprises:
   sending, by the network slice selection function network element, a second message to a unified data repository network element of the visited network of the terminal, wherein the second message comprises the first identifier and the network identifier of the home network of the terminal; and
   receiving, by the network slice selection function network element, the first mapping information from the unified data repository network element of the visited network of the terminal.

4. The method according to claim 1, wherein the first message further comprises a network identifier of the home network of the terminal, and wherein the obtaining, by the network slice selection function network element based on the first identifier, first mapping information corresponding to the third-party SP comprises:
   querying, by the network slice selection function network element based on the first identifier and with reference to the network identifier of the home network of the terminal, locally stored mapping information between NSSAI allocated by different operators to the third-party SP, to obtain the first mapping information.

5. The method according to claim 4, wherein the method further comprises:
   separately receiving, by the network slice selection function network element, respective mapping information between NSSAI allocated by different operators to each third-party SP from a third-party device of a corresponding third-party SP.

6. The method according to claim 1, wherein the first identifier comprises at least one of a third-party identifier allocated by the third-party SP, a device identifier of a third-party device corresponding to the third-party SP, or an identifier of the terminal.

7. The method according to claim 1, wherein the first message further comprises a network identifier of the home network of the terminal, and wherein the obtaining, by the network slice selection function network element based on the first identifier, first mapping information corresponding to the third-party SP comprises:
- separately sending, by the network slice selection function network element, a respective third message to a corresponding third-party device of each third-party SP, wherein a third message comprises a first identifier, a network identifier of the home network of the terminal, and a network identifier of the visited network of the terminal; and
- separately receiving, by the network slice selection function network element, respective first mapping information from the corresponding third-party device of each third-party SP.

8. The method according to claim 7, wherein the third message further comprises one or more of the NSSAI subscribed to by the terminal, and wherein the NSSAI of the home network of the terminal is one or more of the NSSAI subscribed to by the terminal.

9. A network slice selection function network element, comprising:
- at least one processor;
- one or more memories coupled to the at least one processor and storing programming instructions for execution by the at least one processor to:
  - receive, by a transceiver, a first message from a mobility management network element, wherein the first message comprises network slice selection assistance information (NSSAI) subscribed to by a terminal and slice subscription information of n third-party service providers (SPs) corresponding to the NSSAI subscribed to by the terminal, slice subscription information of a third-party SP in the slice subscription information of the n third-party SPs comprises a first identifier, the first identifier is used to search for mapping information of a plurality of NSSAIs, each of the plurality of NSSAIs is allocated by a different operator to the third-party SP, the mapping information is managed by the third-party SP, and n is a positive integer;
  - obtain, based on the first identifier, first mapping information corresponding to the third-party SP, wherein the first mapping information comprises mapping information between NSSAI of a home network of the terminal and NSSAI of a visited network of the terminal; and
  - determine allowed NSSAI for the terminal based on the NSSAI subscribed to by the terminal and the first mapping information, wherein the allowed NSSAI is used to indicate one or more network slices that the terminal is allowed to access in the visited network of the terminal.

10. The network slice selection function network element according to claim 9, wherein the first identifier comprises at least one of a third-party identifier of the third-party SP or a device identifier of a third-party device of the third-party SP.

11. The network slice selection function network element according to claim 9, wherein the first message further comprises a network identifier of the home network of the terminal, and wherein the programming instructions are for execution by the at least one processor to:
- send a second message to a unified data repository network element of the visited network of the terminal, wherein the second message comprises the first identifier and the network identifier of the home network of the terminal; and
- receive the first mapping information from the unified data repository network element of the visited network of the terminal.

12. The network slice selection function network element according to claim 9, wherein the first message further comprises a network identifier of the home network of the terminal, and wherein the programming instructions are for execution by the at least one processor to:
- query, based on the first identifier and with reference to the network identifier of the home network of the terminal, locally stored mapping information between NSSAI allocated by different operators to the third-party SP, to obtain the first mapping information.

13. The network slice selection function network element according to claim 9, wherein the first message further comprises a network identifier of the home network of the terminal, and wherein the programming instructions are for execution by the at least one processor to:
- send a respective third message to a corresponding third-party device of each third-party SP, wherein a third message comprises a first identifier, a network identifier of the home network of the terminal, and a network identifier of the visited network of the terminal; and
- receive respective first mapping information from the corresponding third-party device of each third-party SP.

* * * * *